US012700920B2

(12) United States Patent
Jia et al.

(10) Patent No.: US 12,700,920 B2
(45) Date of Patent: Aug. 4, 2026

(54) METHOD AND APPARATUS FOR REPORTING BEAM FAILURE-RELATED INFORMATION

(71) Applicant: 1FINITY Inc., Kawasaki (JP)

(72) Inventors: Meiyi Jia, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 14 days.

(21) Appl. No.: 18/791,519

(22) Filed: Aug. 1, 2024

(65) Prior Publication Data

US 2024/0396627 A1     Nov. 28, 2024

Related U.S. Application Data

(63) Continuation of application No. PCT/CN2022/075935, filed on Feb. 10, 2022.

(51) Int. Cl.
*H04L 23/02*       (2006.01)
*H04B 7/06*        (2006.01)
*H04B 7/185*       (2006.01)

(52) U.S. Cl.
CPC ....... *H04B 7/18582* (2013.01); *H04B 7/0639* (2013.01)

(58) Field of Classification Search
CPC .... H04B 7/18582; H04B 7/0639; H04B 7/06; H04L 5/00; H04L 5/0091; H04L 5/0032;
(Continued)

(56) References Cited

U.S. PATENT DOCUMENTS

2020/0137821 A1     4/2020   Cirik et al.
2020/0383167 A1    12/2020   Sengupta et al.
(Continued)

FOREIGN PATENT DOCUMENTS

WO      2021027705 A1     2/2021
WO      2021/230544 A1    11/2021
WO      2021/240051 A1    12/2021

OTHER PUBLICATIONS

The Extended European search report with the Supplementary European search report and the European search opinion, issued by the European Patent Office for corresponding European Patent Application No. 22925348.9, mailed on Mar. 17, 2025.
(Continued)

*Primary Examiner* — Khai Tran
(74) *Attorney, Agent, or Firm* — Myers Wolin, LLC

(57)          ABSTRACT

An apparatus for reporting beam failure-related information, the apparatus being applicable to a terminal, includes: first processor circuitry configured to generate a beam failure recovery MAC CE(BFR MAC CE) containing beam failure-related information; and a first transmitter configured to transmit the beam failure recovery MAC CE to a network device to report the beam failure-related information, wherein in the beam failure-related information of the beam failure recovery MAC CE, when octet(s) indicating beam failure recovery information for BFD-RS set(s) are present, the octet(s) indicating the beam failure recovery information for BFD-RS set(s) occur based on an ascending order of serving cell indices of secondary cells, or based on an ascending order of BFD-RS set identifiers or indices and an ascending order of serving cell indices of secondary cells.

11 Claims, 12 Drawing Sheets

(58) Field of Classification Search

CPC H04W 24/04; H04W 74/0833; H04W 72/231

USPC .................................. 375/262, 260, 267, 299

See application file for complete search history.

(56) References Cited

U.S. PATENT DOCUMENTS

2021/0314979 A1* 10/2021 Agiwal ................. H04L 5/0032
2022/0039077 A1    2/2022 Koskela et al.
2023/0199529 A1*  6/2023 Koskela ............... H04L 5/0091
                                                    370/216

OTHER PUBLICATIONS

3GPP TS38.321 V16.7.0, "3rd Generation Partnership Project; Technical Specification Group Radio Access Network; NR; Medium Access Control (MAC) protocol specification (Release 16)" Dec. 2021.

Samsung, "Multi TRP Beam Failure Detection and Recovery", Agenda Item: 8.17.3, 3GPP TSG RAN WG2 Meeting #116bis-e, R2-2200205, Jan. 17-25, 2022.

Notice of Reasons for Refusal issued by the Japan Patent Office for corresponding Japanese Patent Application No. 2024-546506, mailed on Jun. 17, 2025, with an English translation.

International Search Report and Written Opinion of the International Searching Authority issued by the China National Intellectual Property Administration for corresponding International Patent Application No. PCT/CN2022/075935, mailed on Sep. 21, 2022, with an English translation.

Huawei et al., "Beam failure recovery for multi-TRP", Agenda Item: 8.17.3, 3GPP TSG-RAN WG2 Meeting #116-e, R2-2110877, Electronic, Nov. 1-12, 2021.

ZTE Corporation et al., "Correction on 38.321 for BFR MAC CE Design", Work item code: NR_eMIMO-Core, Change Request, 3GPP TSG-RAN2 Meeting #111-e, R2-2007525, Online , Aug. 17-Jun. 28, 2020.

The First Examination Report issued by the Indian Patent Office for corresponding Indian Patent Application No. 202417059371, mailed on Jun. 8, 2026, with an English translation.

* cited by examiner

| C₇ | C₆ | C₅ | C₄ | C₃ | C₂ | C₁ | SP |
|---|---|---|---|---|---|---|---|

| AC | R | Candidate RS ID or R bit |
|---|---|---|

...

| AC | R | Candidate RS ID or R bit |
|---|---|---|

FIG. 1

| C₇ | C₆ | C₅ | C₄ | C₃ | C₂ | C₁ | SP |
|---|---|---|---|---|---|---|---|
| C₁₅ | C₁₄ | C₁₃ | C₁₂ | C₁₁ | C₁₀ | C₉ | C₈ |
| C₂₃ | C₂₂ | C₂₁ | C₂₀ | C₁₉ | C₁₈ | C₁₇ | C₁₆ |
| C₃₁ | C₃₀ | C₂₉ | C₂₈ | C₂₇ | C₂₆ | C₂₅ | C₂₄ |

| AC | R | Candidate RS ID or R bit |
|---|---|---|

...

| AC | R | Candidate RS ID or R bit |
|---|---|---|

Generating a beam failure recovery MAC CE (BFR MAC CE) containing beam failure-related information

602

Transmitting the beam failure recovery MAC CE to a network device to report the beam failure-related information, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells

FIG. 6

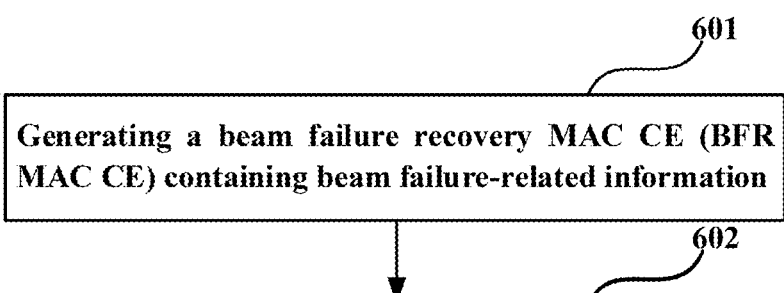

| C7 | C6 | C5 | C4 | C3 | C2 | C1 | SP |
|---|---|---|---|---|---|---|---|
| C7 | C6 | C5 | C4 | C3 | C2 | C1 | SP |
| AC | R | Candidate RS ID or R bit | | | | | |

...

| AC | R | Candidate RS ID or R bit |
|---|---|---|

FIG. 7

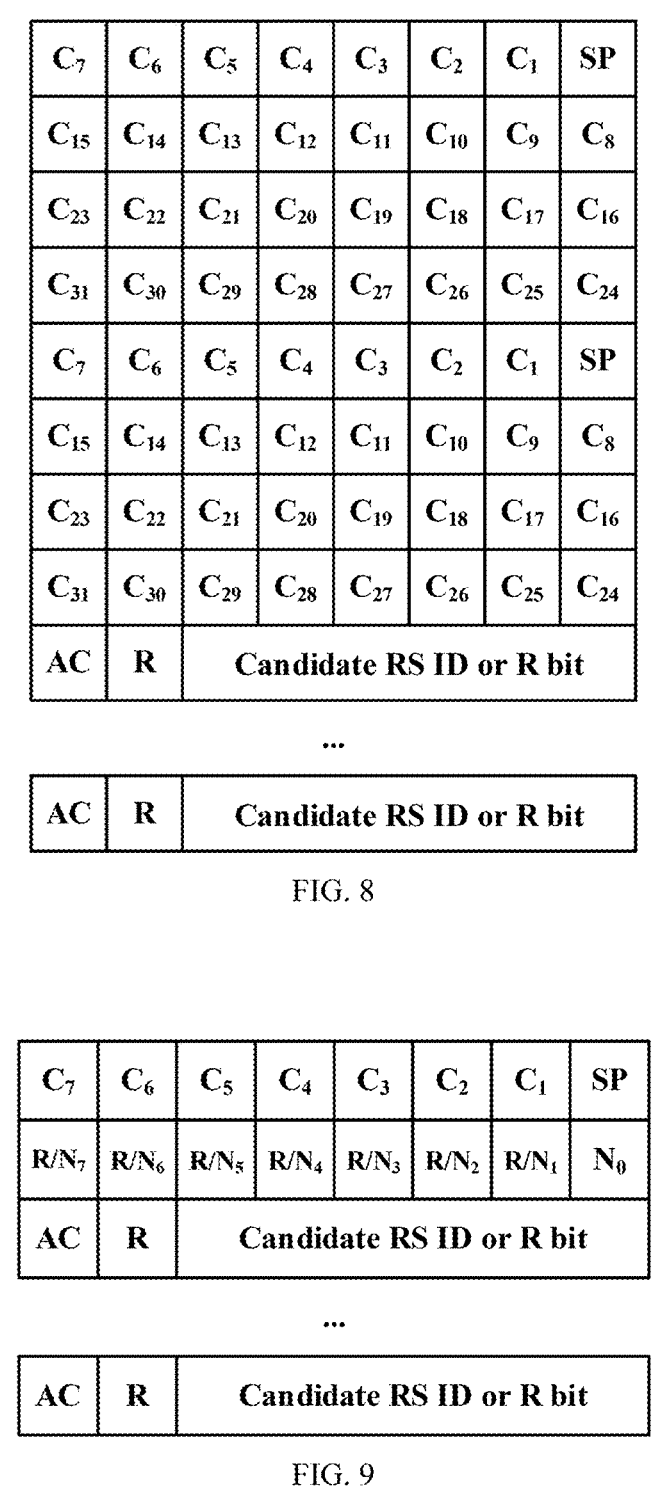

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $C_7$ | $C_6$ | $C_5$ | $C_4$ | $C_3$ | $C_2$ | $C_1$ | SP |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bit | | | | | |

...

| AC | R | Candidate RS ID or R bit | | | | | |
|---|---|---|---|---|---|---|---|

FIG. 8

| $C_7$ | $C_6$ | $C_5$ | $C_4$ | $C_3$ | $C_2$ | $C_1$ | SP |
|---|---|---|---|---|---|---|---|
| $R/N_7$ | $R/N_6$ | $R/N_5$ | $R/N_4$ | $R/N_3$ | $R/N_2$ | $R/N_1$ | $N_0$ |
| AC | R | Candidate RS ID or R bit | | | | | |

...

| AC | R | Candidate RS ID or R bit | | | | | |
|---|---|---|---|---|---|---|---|

FIG. 9

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $R/N_7$ | $R/N_6$ | $R/N_5$ | $R/N_4$ | $R/N_3$ | $R/N_2$ | $R/N_1$ | $N_0$ |
| AC | R | Candidate RS ID or R bit | | | | | |

...

| AC | R | Candidate RS ID or R bit |
|---|---|---|

FIG. 10

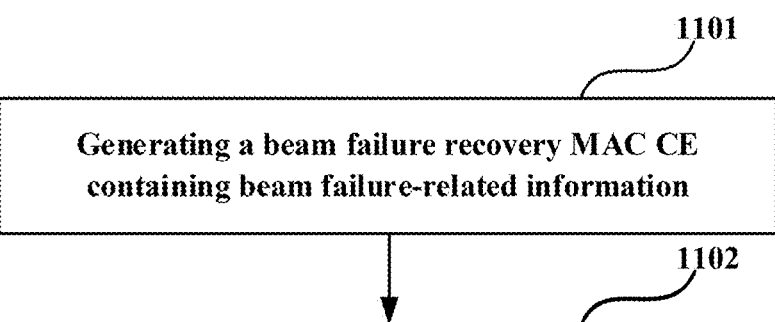

1101

Generating a beam failure recovery MAC CE containing beam failure-related information

1102

Transmitting the beam failure recovery MAC CE to a network device to report the beam failure-related information, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information

FIG. 11

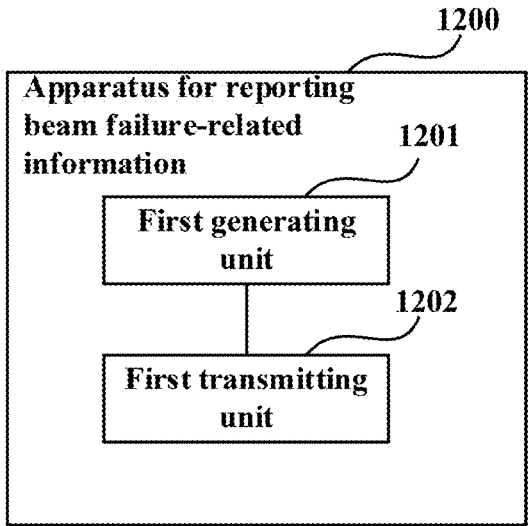

1200

Apparatus for reporting beam failure-related information

1201

First generating unit

1202

First transmitting unit

Receiving a beam failure recovery MAC CE containing beam failure-related information from a terminal equipment, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells. For example, in the beam failure-related information of the beam failure recovery MAC CE, when the octet(s) of the special cell indicating beam failure recovery information for TRP(s) are present, the octet(s) of the special cell indicating the beam failure recovery information for TRP(s) occur before the octet(s) of the secondary cell indicating beam failure recovery information for TRP(s)

Receiving a beam failure recovery MAC CE containing beam failure-related information from a terminal equipment, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap

METHOD AND APPARATUS FOR REPORTING BEAM FAILURE-RELATED INFORMATION

CROSS-REFERENCE TO RELATED APPLICATION

This application is a continuation application of International Application PCT/CN2022/075935 filed on Feb. 10, 2022, and designated the U.S., the entire contents of which are incorporated herein by reference.

TECHNICAL FIELD

This disclosure relates to the field of communication technologies.

BACKGROUND

Rel-15 NR includes some MIMO (multiple input multiple output) features to promote use of a large number of antenna elements at frequency bands below and above 6 GHz at a base station side.

Rel-16 NR enhances Rel-15 NR by introducing enhanced Type II codebooks based on discrete Fourier transform (DFT) compression, supporting multiple transmission reception points (TRP) transmission, especially for an enhanced mobile broadband (eMBB) and a physical downlink shared channel (PDSCH), enhancement of multi-beam operations, including reduction of measurement reconfiguration overhead related to latency and/or multiple quasi-colocation (QCL), secondary cell (SCell) beam failure recovery (BFR), a, L1-SINR, a peak-to-average power ratio (PAPR) reference signal, and ensuring characteristics of uplink full power transmission.

NR is currently in a process of commercialization, and from actual deployment scenarios, various aspects that need to be further enhanced can be identified, such as inter-cell beam management (ICBM), including:

Rel-16 has managed to reduce overhead and/or latency, and high-speed vehicle scenarios on FR2 (such as terminal equipments traveling at high speeds on highways) require more active reduction of latency and overhead, not only for intra-cell but also for inter-cell L1 and L2 layer mobility, which further includes reducing occurrence of beam failure events;

Rel-16 studied enhancement of ensuring panel-specific uplink (UL) beam selection, but did not have enough time to complete the work. This provides some possibilities for increasing uplink coverage, including alleviating uplink coverage losses caused by satisfying a maximum permissible exposure (MPE) rule;

channels other than a PDSCH can benefit from multi-TRP transmission (as well as multi-panel reception), which also includes inter-cell multi-TRP operations. This includes some new multi-TRP use cases, such as scenarios of uplink dense deployment within a macro cell and/or deployment of heterogeneous network types;

due to the use of multi-scenario SRSs, at least for capacity and coverage, it is possible and necessary to further enhance the channel sounding reference signals (SRSs);

although Rel-16 supports enhanced Type II channel state information (CSI), some rooms for further enhancement may be sensed. This includes utilization of CSI and some heterogeneities of channel statistics designed for multi-TRP/panel for NC-JT use cases, such as angles and latency, with a major goal of deployment of FR1 frequency division duplex (FDD).

Rel-17 NR supports enhancement of multi-TRP deployment, with a major goal of FR1 and FR2, including:

a. using multiple TRPs and/or multiple panels, with Rel-16 reliability as the baseline, identifying and defining characteristics of improving reliability and robustness of channels other than a PDSCH (i.e. a PDCCH, a PUSCH, and a PUCCH);

b. identifying and defining enhancement related to QCL (quasi-colocation)/TCI (transmission configuration indication) to ensure inter-cell multi-TRP operations, assuming multi-PDSCH reception based on multi-DCI (downlink control information) and based on Rel-15/16 TCI architectures;

c. for multi-TRP simultaneous transmission with multi-panel reception, evaluating and defining, if necessary, beam management related enhancement; and d. enhancement to support HST-SFN deployment scenarios:

i. determining and defining a solution to the QCL assumption of a demodulation reference signal (DMRS), such as multiple QCL assumptions of identical DMRS ports, with the goal of DL-only transmission; and ii. evaluating and defining a QCL/QCL-like relationship (including applicable types and related demands) between downlink (DL) and uplink (UL) signals, if proven to be superior to the Rel-16 HST enhanced baseline, by reusing a unified TCI architecture;

According to the "a" above, in order to improve reliability and robustness of channels, for scenarios where multiple TRPs are deployed, Rel-17 supports TRP-specific beam failure detection and recovery.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Beam failure information of a secondary cell is carried by a beam failure recovery (BFR) MAC CE and transmitted to a serving network device (such as a serving gNB). The BFR MAC CE includes a BFR MAC CE or a truncated BFR MAC CE, the BFR MAC CE and the truncated BFR MAC CE being identified by an MAC header carrying a logical channel identifier (LCID)/eLCID.

Sizes of the BFR MAC CE and the truncated BFR MAC CE are variable. They include a bitmap and beam failure recovery information arranged in an ascending order of serving cell indices (ServCellIndex), that is, they include octet(s) of candidate beam availability indication (AC) of a secondary cell indicated by the bitmap.

For the BFR MAC CE, when the MAC entity detects a beam failure and a highest serving cell index ServCellIndex of a secondary cell that has completed candidate beam evaluation is less than 8, a 1-octet bitmap is used; otherwise a 4-octet bitmap is used. A MAC PDU includes at most one BFR MAC CE.

For the truncated BFR MAC CE, if the MAC entity detects a beam failure and a highest serving cell index ServCellIndex of a secondary cell that has completed candidate beam evaluation is less than 8, or if a special cell detects a beam failure and the special cell will be indicated in a truncated BFR MAC CE and a result of logical channel optimization (LCP) is that a UL-SCH resource is unable to accommodate a truncated BFR MAC CE of a 4-octet bitmap plus its subhead, a 1-octet bitmap is used; otherwise a 4-octet bitmap is used.

Fields in the BFR MAC CE are defined as follows:

SP: this field indicates beam failure detection of a special cell of the MAC entity; only when a BFR MAC CE or a truncated BFR MAC CE will be included in an MAC PDU and taken as a part of a random access procedure, the SP field is set to be 1, indicating a beam failure of the special cell; otherwise, it is set to be 0;

Ci (for a BFR MAC CE): this field indicates beam failure detection of a secondary cell of a serving cell index ServCellIndex i and presence of octet(s) including its AC field; setting the Ci field to be 1 indicates that a beam failure is detected in the secondary cell of Serv-CellIndex i, evaluation of candidate beams is completed and octet(s) including its AC field are present; setting the Ci field to be 0 indicates that a beam failure is not detected in the secondary cell of ServCellIndex i or a beam failure is detected but evaluation of candidate beams is not completed, and the octet(s) including the AC field are not present; the octet(s) including the AC field occur based on an ascending order of ServCellIndex;

Ci (for a truncated BFR MAC CE): this field indicates beam failure detection of a secondary cell of a serving cell index ServCellIndex i; setting the Ci field to be 1 indicates that a beam failure is detected in the secondary cell of ServCellIndex i, evaluation of candidate beams is completed and octet(s) including its AC field may be present; setting the Ci field to be 0 indicates that a beam failure is not detected in the secondary cell of ServCellIndex i or a beam failure is detected but evaluation of candidate beams is not completed, and the octet(s) including its AC field are not present; if they are present, the octet(s) including the AC field occur based on an ascending order of ServCellIndex; and the number of octet(s) including the AC field (which may be 0) is maximized, while not exceeding a size of an available grant;

AC: this field indicates presence of a candidate RS ID field in this octet; if this AC field is set to be 1, the candidate RS ID field is present; and if this AC field is set to be 0, R bits are present; candidate RS ID: this field is set to be an index of an SSB or CSI-RS, and a length of this field is 6 bits;

R: reserve bits, and is set to be 0.

FIG. 1 is a schematic diagram of a BFR MAC CE or a truncated BFR MAC CE including a 1-octet bitmap, and FIG. 2 is a schematic diagram of a BFR MAC CE or a truncated BFR MAC CE including a 4-octet bitmap. Meanings of fields of the BFR MAC CE or the truncated BFR MAC CE shown in FIGS. 1 and 2 are as those described above.

In multi-TRP operations, beam failure detection of individual BFD-RS set(s) per TRP is supported, and simultaneous configuration of cell-specific BFR and TRP-specific BFR on different CCs is supported.

Triggering of TRP-specific beam failure recovery includes:

for each serving cell configured with beam failure detection, the MAC entity will:

if this serving cell is configured with multiple BFD-RS set(s), for each BFD-RS set in this serving cell, the MAC entity will:

if a beam failure instance indication from a BFD-RS set is received from a lower layer:

start or restart a beam failure detection timer beamFailureDetectionTimer;

adding 1 to BFI_COUNTER;

if BFI_COUNTER is greater than or equal to beamFailureInstanceMaxCount:

trigger the BFR of the BFD-RS set of this serving cell;

if BFR is triggered in two BFD-RS sets in this serving cell and has not been successfully completed:

if this serving cell is a special cell (SpCell):

initiate a random access procedure on this special cell;

if this serving cell is a special cell and a random access procedure initiated for beam failure recovery of the two BFD-RS sets of this special cell is successfully completed:

set BFI_COUNTER of each BFD-RS set in the special cell to be 0;

deem that the beam failure recovery procedure is successfully completed;

if beamFailureDetectionTimer of this BFD-RS set expires, or if a higher layer reconfigures beamFailure Detection Timer, beamFailure InstanceMaxCount or any reference signal for beam failure detection of this BFD-RS set of this serving cell, set BFI_COUNTER to be 0;

if a C-RNTI addressed PDCCH is received, indicate a newly-transmitted uplink grant of an HARQ process for transmitting an enhanced BFR MAC CE or truncated enhanced BFR MAC CE including beam failure recovery information of the BFD-RS set of this serving cell, or if the secondary cell is deactivated, set BFI-_COUNTER to be 0; and when an MAC PDU is transmitted and the PDU includes an enhanced BFR MAC CE or truncated enhanced BFR MAC CE, which includes beam failure recovery information of a BFD-RS of a secondary cell, cancel all triggered BFR of this BFD-RS of the secondary cell.

For an enhanced BFR MAC CE or a truncated enhanced BFR MAC CE:

the MAC entity will:

1> if it is determined in a beam failure recovery procedure that BFR of at least one secondary cell has been triggered and not canceled, beam evaluation of the secondary cell has been completed, 2> if a UL-SCH resource is available for a new transmission and a result of LCP is that this UL-SCH resource is able to accommodate a BFR MAC CE plus its subheader, 3> instruct a multiplexing and assembly process to generate a BFR MAC CE;

2> otherwise, if the UL-SCH resource is available for a new transmission and the result of LCP is that this UL-SCH resource is able to accommodate a truncated BFR MAC CE plus its subheader, 3> instruct the multiplexing and assembly process to generate a truncated BFR MAC CE;

2> otherwise, trigger an SR for secondary cell beam failure recovery of each secondary cell where BFR has been triggered and has not been canceled and candidate beam evaluation has been completed;

1> if it is determined in the beam failure recovery procedure that at least one piece of BFR of a BFD-RS set of a secondary cell has been triggered and has not been canceled, and beam evaluation of the secondary cell has been completed, or

1> if it is determined in the beam failure recovery procedure that only one piece of BFR of a BFD-RS set of a special cell has been triggered and has not been canceled, and beam evaluation of the special cell has been completed, 2> if a UL-SCH resource is available for a new transmission and a result of LCP is that this UL-SCH resource is able to accommodate an enhanced BFR MAC CE plus its subheader, 3> instruct the multiplexing and assembly process to generate an enhanced BFR MAC CE;

2> otherwise, if the UL-SCH resource is available for a new transmission and the result of LCP is that this UL-SCH resource is able to accommodate a truncated enhanced BFR MAC CE plus its subheader, 3> instruct the multiplexing and assembly process to generate a truncated enhanced BFR MAC CE;

2> otherwise, trigger an SR for secondary cell beam failure recovery of each BFD-RS set where BFR has been triggered and has not been canceled and candidate beam evaluation has been completed.

When an MAC PDU is transmitted and the PDU includes an enhanced BFR MAC CE or a truncated enhanced BFR MAC CE containing beam failure information of a BFD-RS set of a serving cell, all triggered BFR of this BFD-RS set of the secondary cell will be canceled.

Based on the above description, the MAC CE of the BFR of the BFD-RS set includes an enhanced BFR MAC CE or a truncated enhanced BFR MAC CE. Hence, there is a need to define how to truncate an enhanced BFR MAC CE.

According to an existing mechanism, a truncated BFR MAC CE is a truncated format of a BFR MAC CE, and truncation thereof includes two aspects as follows:

(1) for a secondary cell where a beam failure has been detected and evaluation of candidate beams has been completed, in a truncated BFR MAC CE, octet(s) including an AC field of this secondary cell may not be present; if the octet(s) including an AC field are present, the octet(s) including an AC field occur based on an ascending order of ServCellIndex. The number of octet(s) including the AC field (which may be 0) is maximized, while it does not exceed a size of an available grant;

(2) a beam failure has detected in a special cell and the special cell will be indicated in a truncated BFR MAC CE, and a result of LCP is that a UL-SCH resource available for transmission is insufficient to accommodate the truncated BFR MAC CE of the 4-octet bitmap plus it subheader, and a 1-octet bitmap is used.

It was found by the inventors that following problems exist in the truncated enhanced BFR MAC CE, i.e. the truncated format of the enhanced BFR MAC CE:

in case of (1), on the one hand, for the secondary cell where a beam failure has been detected and evaluation of candidate beams has been completed, in the truncated BFR MAC CE, the octet(s) of this secondary cell including the AC field may not be present; and on the other hand, the number of the octet(s) including the AC field (which may be 0) is maximized, while it does not exceed a size of an available grant. If the grant is able to accommodate only one octet including the AC field, and two TRPs of a secondary cell detect beam failures, two aspects, namely, a size of the grant and maximizing the number of octet(s) including the AC field (beam failure recovery information), may not be satisfied simultaneously;

in addition, two currently available enhanced BFR MAC CE formats involve two bitmaps, and in a case of (2), that is, a beam failure is detected in the special cell and the special cell is indicated in a truncated BFR MAC CE, and the result of LCP is that the UL-SCH resource available for transmission is insufficient to accommodate the truncated BFR MAC CE of the 4-octet bitmap plus its subheader, which 1-octet bitmap is to be used is unable to be determined.

In order to solve one or more of the above problems, embodiments of this disclosure provide a method and apparatus for reporting beam failure-related information.

According to a first aspect of the embodiments of this disclosure, there is provided an apparatus for reporting beam failure-related information, the apparatus being applicable to a terminal equipment, and the apparatus including: a first generating unit configured to generate a beam failure recovery MAC CE (BFR MAC CE) containing beam failure-related information; and a first transmitting unit configured to transmit the beam failure recovery MAC CE to a network device to report the beam failure-related information, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

According to a second aspect of the embodiments of this disclosure, there is provided an apparatus for reporting beam failure-related information, the apparatus being applicable to a terminal equipment, and the apparatus including: a second generating unit configured to generate a beam failure recovery MAC CE containing beam failure-related information; and a second transmitting unit configured to transmit the beam failure recovery MAC CE to a network device to report the beam failure-related information, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information.

According to a third aspect of the embodiments of this disclosure, there is provided an apparatus for receiving beam failure-related information, the apparatus being applicable to a network device, and the apparatus including: a first receiving unit configured to receive a beam failure recovery MAC CE containing beam failure-related information from a terminal equipment, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

According to a fourth aspect of the embodiments of this disclosure, there is provided an apparatus for receiving beam failure-related information, the apparatus being applicable to a network device, and the apparatus including: a second receiving unit configured to receive a beam failure recovery MAC CE containing beam failure-related information from a terminal equipment, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap.

According to a fifth aspect of the embodiments of this disclosure, there is provided a terminal equipment, including the apparatus as described in the embodiments of the first or second aspect of this disclosure.

According to a sixth aspect of the embodiments of this disclosure, there is provided a network device, including the apparatus as described in the embodiments of the third or fourth aspect of this disclosure.

According to a seventh aspect of the embodiments of this disclosure, there is provided a communication system, including the terminal equipment as described in the embodiments of the fifth aspect of this disclosure and/or the network device as described in the embodiments of the sixth aspect of this disclosure.

According to an eighth aspect of the embodiments of this disclosure, there is provided a method for reporting beam failure-related information, the method being applicable to a terminal equipment, and the method including: generating a beam failure recovery MAC CE (BFR MAC CE) containing beam failure-related information; and transmitting the beam failure recovery MAC CE to a network device to report the beam failure-related information, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

According to a ninth aspect of the embodiments of this disclosure, there is provided a method for reporting beam failure-related information, the method being applicable to a terminal equipment, and the method including: generating a beam failure recovery MAC CE containing beam failure-related information; and transmitting the beam failure recovery MAC CE to a network device to report the beam failure-related information, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information.

According to a ten aspect of the embodiments of this disclosure, there is provided a method for receiving beam failure-related information, the method being applicable to a network device, and the method including: receiving a beam failure recovery MAC CE containing beam failure-related information from a terminal equipment, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

According to an eleventh aspect of the embodiments of this disclosure, there is provided a method for receiving beam failure-related information, the method being applicable to a network device, and the method including: receiving a beam failure recovery MAC CE containing beam failure-related information from a terminal equipment, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap.

According to a twelfth aspect of the embodiments of this disclosure, there is provided a computer readable program code, which, when executed in an apparatus for reporting beam failure-related information or a terminal equipment, will cause the apparatus for reporting beam failure-related information or the terminal equipment to carry out the method for reporting beam failure-related information described in the eighth or ninth aspect of the embodiments of this disclosure.

According to a thirteenth aspect of the embodiments of this disclosure, there is provided a computer readable medium, including a computer readable program code, which will cause an apparatus for reporting beam failure-related information or a terminal equipment to carry out the method for reporting beam failure-related information described in the eighth or ninth aspect of the embodiments of this disclosure.

According to a fourteenth aspect of the embodiments of this disclosure, there is provided a computer readable program code, which, when executed in an apparatus for receiving beam failure-related information or a network device, will cause the apparatus for receiving beam failure-related information or the network device to carry out the method for receiving beam failure-related information described in the tenth or eleventh aspect of the embodiments of this disclosure.

According to a fifteenth aspect of the embodiments of this disclosure, there is provided a computer readable medium, including a computer readable program code, which will cause an apparatus for receiving beam failure-related information or a network device to carry out the method for receiving beam failure-related information described in the tenth or eleventh aspect of the embodiments of this disclosure.

An advantage of the embodiments of this disclosure exists in that in the beam failure-related information of the beam failure recovery MAC CE reported to the network device, when octet(s) indicating beam failure recovery information for TRP(s) are present, the octet(s) indicating beam failure recovery information for TRP(s) occur based on an ascending order of BFD-RS set identifiers or indices and/or an ascending order of serving cell indices of the secondary cell. Therefore, the reported beam failure recovery information is TRP-specific, hence, at least one piece of beam failure recovery information for TRP(s) may be reported when multiple TRPs (such as two TRPs) of a cell detect beam failures, while satisfying the requirements of a size of a grant and maximizing inclusion of the beam failure recovery information.

In addition, when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet first bitmap plus it subheader, a beam failure recovery MAC CE containing a 1-octet first bitmap is used to report the beam failure-related information. Hence, in a case where beam failure recovery MAC CEs include two bitmaps, a beam failure recovery MAC CE which contains a 1-octet bitmap may be determined for use in reporting beam failure-related information.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or sets thereof.

BRIEF DESCRIPTION OF THE DRAWINGS

Elements and features depicted in one drawing or embodiment of this disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 1 is schematic diagram of a BFR MAC CE or a truncated BFR MAC CE containing a 1-octet bitmap;

FIG. 2 is a schematic diagram of a BFR MAC CE or a truncated BFR MAC CE containing a 4-octet bitmap;

FIG. 6 is a schematic diagram of the method for reporting beam failure-related information of embodiment 1 of this disclosure;

FIG. 7 is a schematic diagram of a (truncated) enhanced beam failure recovery MAC CE of an implementation of embodiment 1 of this disclosure;

FIG. 8 is another schematic diagram of the (truncated) enhanced beam failure recovery MAC CE of an implementation of embodiment 1 of this disclosure;

FIG. 9 is a further schematic diagram of the (truncated) enhanced beam failure recovery MAC CE of an implementation of embodiment 1 of this disclosure;

FIG. 10 is still another schematic diagram of the (truncated) enhanced beam failure recovery MAC CE of an implementation of embodiment 1 of this disclosure;

FIG. 11 is a schematic diagram of the method for reporting beam failure-related information of embodiment 2 of this disclosure;

FIG. 12 is a schematic diagram of the apparatus for reporting beam failure-related information of embodiment 3 of this disclosure;

FIG. 15 is a schematic diagram of the method for receiving beam failure-related information of embodiment 6 of this disclosure;

FIG. 16 is another schematic diagram of the method for receiving beam failure-related information of embodiment 6 of this disclosure;

DETAILED DESCRIPTION

Figure 3:
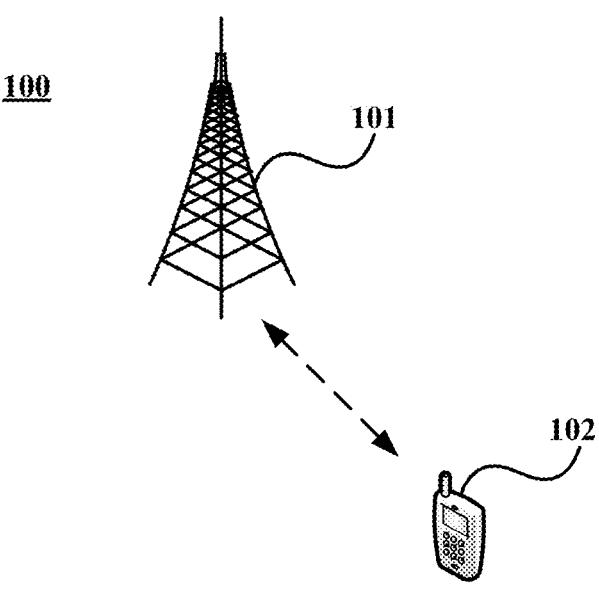
FIG. 3 is a schematic diagram of a communication system of an embodiment of this disclosure.

These and further aspects and features of this disclosure will be apparent with reference to the following description and attached drawings. In the description and drawings, particular embodiments of this disclosure have been disclosed in detail as being indicative of some of the ways in which the principles of this disclosure may be employed, but it is understood that this disclosure is not limited correspondingly in scope. Rather, this disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And the term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc., such as a terminal equipment in an IAB architecture served by an IAB-node or an IAB-donor.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, all of "when . . . ", "in a case where . . . ", "for a case where . . . " and "if . . . " denote being based on one or some conditions or states, and furthermore, all of these expressions are interchangeable.

Scenarios of the embodiments of this disclosure shall be described below by way of examples; however, this disclosure is not limited thereto.

FIG. 3 is a schematic diagram of a communication system of an embodiment of this disclosure, in which a case where a terminal equipment and a network device are taken as examples is schematically shown. As shown in FIG. 3, a communication system 100 may include a network device 101 and a terminal equipment 102. For the sake of simplicity, an example having only one terminal equipment is schematically given in FIG. 3. The network device 101, for example, is a network device gNB of NR.

In the embodiments of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

For example, when the terminal equipment 102 detects a beam failure, it reports beam failure-related information to the network device 101.

Figure 4:
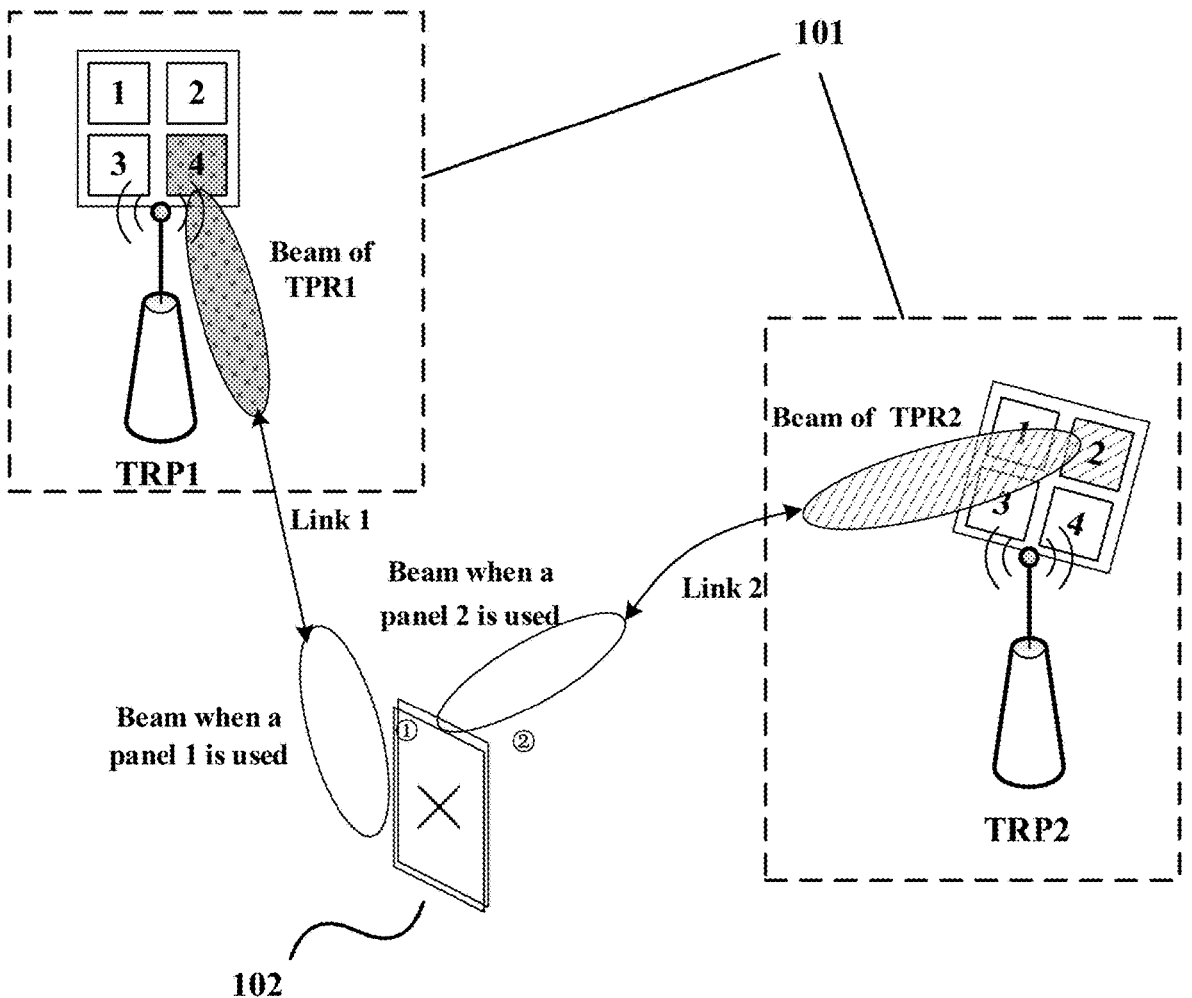
FIG. 4 is a schematic diagram of multi-TRP operations.

FIG. 4 is a schematic diagram of multi-TRP operations. As shown in FIG. 4, in multi-TRP (mTRP) operations, the network device 101 provides services to the terminal equipment 102 via two TRPs, TRP1 and TRP2. A serving cell may schedule the terminal equipment 102 from the two TRPs, TRP1 and TRP2, so as to provide better PDSCH coverage, reliability and/or data rates.

For the multi-TRP operations, there are two different operating modes, namely single-DCI and multi-DCI. For these two modes, within configuration provided by an RRC layer, control of uplink and downlink operations is performed by a physical layer and an MAC layer. In the single-DCI mode, the terminal equipment 102 is scheduled by TRP1 and TRP2 via identical DCI, and in the multi-DCI mode, the UE is scheduled by separate DCI of TRP1 and TRP2.

Figure 5A:
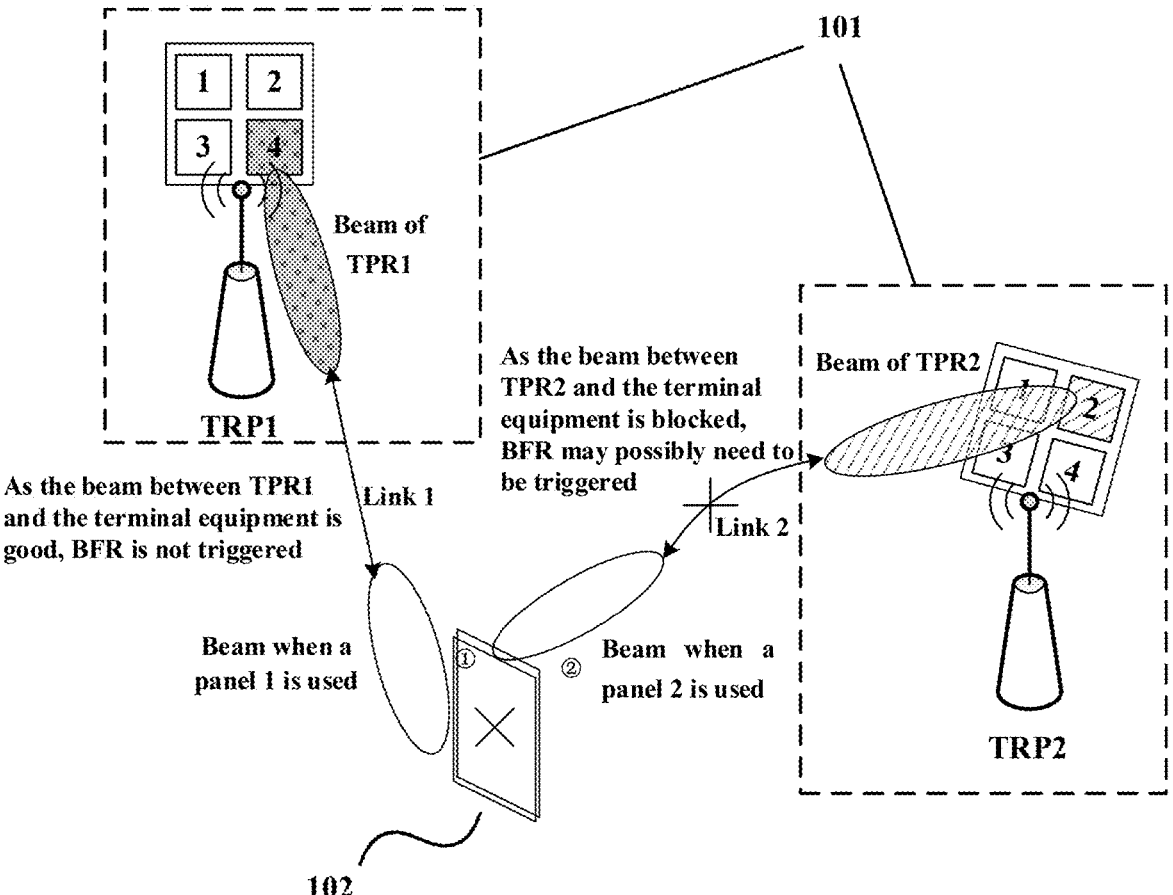
FIG. 5A is a schematic diagram of a scenario of an embodiment of this disclosure.

FIG. 5A is a schematic diagram of a scenario of an embodiment of this disclosure. As shown in FIG. 5A, the network device 101 provides services to the terminal equipment 102 via the two TRPs, namely TRP1 and TRP2, and the two TRPs may belong to the same cell or different cells. For a case where TRP1 and TRP2 belong to different cells, for example, TRP1 belongs to a serving cell, TRP2 belongs to a non-serving cell, and TRP2 is associated with the serving cell to which TRP1 belongs.

In the scenario shown in FIG. 5A, for example, link 1 between TRP1 and the terminal equipment 102 operates normally, that is, beams are good, hence, BFR will not be triggered; however, link 2 between TRP2 and the terminal equipment 102 is blocked, i.e. beam blockage, which means that a beam failure is detected on TPR2, and BFR on TRP2 may need to be triggered.

Figure 5B:
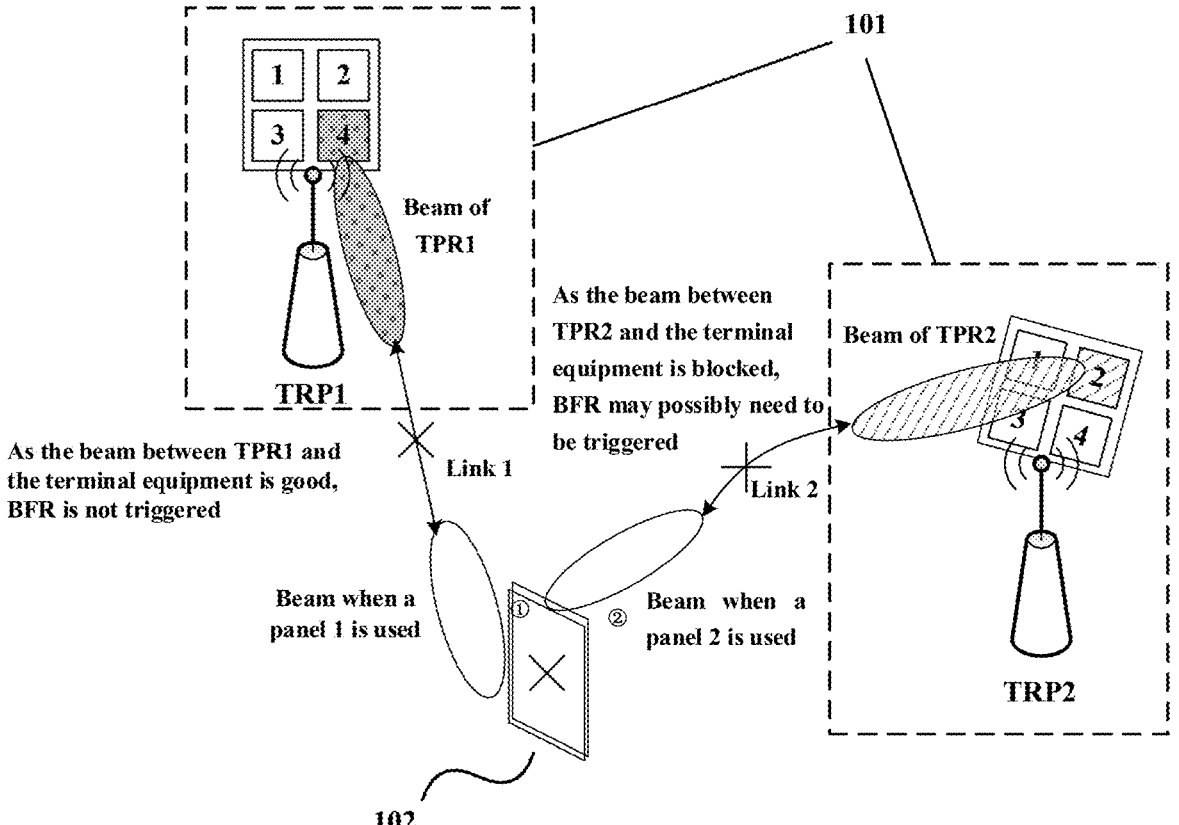
FIG. 5B is another schematic diagram of the scenario of the embodiments of this disclosure.

FIG. 5B is another schematic diagram of the scenario of the embodiments of this disclosure. As shown in FIG. 5B, similar to FIG. 5A, the network device 101 provides services to the terminal equipment 102 via the two TRPs, namely TRP1 and TRP2, which may belong to the same cell or different cells. For a case where TRP1 and TRP2 belong to different cells, for example, TRP1 belongs to a serving cell, TRP2 belongs to a non-serving cell, and TRP2 is associated with the serving cell to which TRP1 belongs.

In the scenario shown in FIG. 5B, for example, link 1 between TRP1 and the terminal equipment 102 is blocked, i.e. beam blockage, and link 2 between TRP2 and the terminal equipment 102 is also blocked, i.e. beam blockage, which means that beam failures are detected on TRP1 and TPR2, and BFR on TRP1 and TRP2 may need to be triggered.

Various implementations of the embodiments of this disclosure shall be described below with reference to the accompanying drawings. These implementations are illustrative only, and are not intended to limit this disclosure.

Embodiment 1

The embodiment of this disclosure provides a method for reporting beam failure-related information. The method is applicable to a terminal equipment, such as terminal equipment 102 shown in FIGS. 3-5.

FIG. 6 is a schematic diagram of the method for reporting beam failure-related information of embodiment 1 of this disclosure. As shown in FIG. 6, the method includes:

step 601: generating a beam failure recovery MAC CE (BFR MAC CE) containing beam failure-related information; and step 602: transmitting the beam failure recovery MAC CE to a network device to report the beam failure-related information, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

Thus, the reported beam failure recovery information is TRP-specific, and in a case where beam failures are detected in multiple TRPs (such as two TRPs) of a cell, at least one piece of beam failure recovery information for TRP(s) is reported, while satisfying the requirements of a size of a grant and maximizing inclusion of the beam failure recovery information.

In the embodiments of this disclosure, for example, in a case where a beam failure is detected in at least one of two TRPs of a cell, the terminal equipment generates and transmits a beam failure recovery MAC CE (BFR MAC CE) containing the beam failure-related information to the network device.

In the embodiments of this disclosure, the beam failure recovery MAC CE (BFR MAC CE) may be an enhanced beam failure recovery MAC CE (enhanced BFR MAC CE) or an enhanced truncated beam failure recovery MAC CE (enhanced truncated BFR MAC CE). For example, reference may be made to the structure of the BFR MAC CE shown in FIGS. 1 and 2 for a structure of the beam failure recovery MAC CE (BFR MAC CE), that is, either a 1-octet bitmap or a 4-octet bitmap may be contained.

In the embodiments of this disclosure, the beam failure recovery MAC CE (BFR MAC CE) includes the beam failure-related information, and the beam failure-related information may include beam failure information, and furthermore, it may include beam failure recovery information.

For example, in the structure of the BFR MAC CE shown in FIGS. 1 and 2, a 1-octet or 4-octet bitmap may be included, and octet(s) containing an AC field may also be included.

That is, the beam failure recovery information for TRP(s) is denoted by the octet(s) containing an AC field, i.e. the octet(s) containing an AC field is TRP-specific (per-TPR).

For example, a Ci field indicates beam failure detection of a TRP/BFD-RS set of a secondary cell of a serving cell index ServCellIndex i and presence of octet(s) including its AC field, when the Ci field is set to be 1, it indicates that a beam failure is detected in at least one TRP of the secondary cell of ServCellIndex i, evaluation of candidate beams is completed and the octet(s) including its AC field are present, and when the Ci field is set to be 0, it indicates that no beam failure is detected in all TRPs of the secondary cell of ServCellIndex i, or beam failure are detected but evaluation of candidate beams is not completed and the octet(s) including its AC field are not present.

In the embodiments of this disclosure, the beam failure recovery information includes octet(s) indicating the beam failure recovery information for TRP(s). The octet(s) indicating beam failure recovery information for TRP(s) are, for example, octet(s) including an AC field.

In the embodiments of this disclosure, the beam failure information may also be referred to as octet(s) associated with the TRP beam failure information, such as octet(s) where a bitmap is located.

In the embodiments of this disclosure, the beam denotes a beam, which may be identified by reference signal (RS) information, such as an SSB index, and a CSI-RS resource ID, etc., and it may also be indicated by a TCI state of a channel, such as a TCI state ID.

In the embodiments of this disclosure, "failure" may refer to "needing to be recovered", and these terms may be interchangeable.

In the embodiments of this disclosure, "a beam failure is detected" may refer to "beam failure recovery is triggered", and these terms may be interchangeable.

In the embodiments of this disclosure, TRP(s), BFD-RS set(s) and control resource set pool(s) (coreset pool(s)) are corresponding to each other, and these terms may be interchangeable.

For example, a cell may have 2 TRPs providing services to the terminal equipment, and each TRP is configured with a set of reference signals for beam failure detection, i.e. a BFD-RS set, that is, the TRP and the BFD-RS set are corresponding to each other.

In the embodiments of this disclosure, the octet(s) indicating beam failure recovery information for TRP(s) may indicate beam failure recovery information for TRP(s) of the secondary cell. In addition, it may also indicate beam failure recovery information for TRP(s) of a special cell.

In the embodiments of this disclosure, when the octet(s) indicating beam failure recovery information for TRP(s) are present in the beam failure-related information of the beam failure recovery MAC CE, the octet(s) indicating beam failure recovery information for TRP(s) occur based on an ascending order of BFD-RS set identifiers or indices and/or an ascending order of serving cell indices of the secondary cell.

That is, in the beam failure recovery MAC CE, when the octet(s) indicating beam failure recovery information for TRP(s) are present, the octet(s) indicating beam failure recovery information for TRP(s) occur based on the ascending order of the BFD-RS set identifier or indices and/or the ascending order of the serving cell indices of the secondary cell.

That is, in the beam failure-related information, when the octet(s) indicating beam failure recovery information for TRP(s) are present, the octet(s) indicating beam failure recovery information for TRP(s) occur based on the ascending order of the BFD-RS set identifiers or indices and/or the ascending order of the serving cell indices of the secondary cell.

In the embodiments of this disclosure, for example, the BFD-RS set identifiers explicitly indicate the BFD-RS set, i.e. an explicit BFD-RS set IDs.

For example, when the BFD-RS set identifiers (explicit BFD-RS set IDs) are not present, the BFD-RS set may be implicitly indicated by the BFD-RS set indices. For example, for a BFD-RS, an index to which a BFD-RS set occurring first or configured first or included first corresponds is 0 or 1, and an index to which a BFD-RS set occurring second or configured second or included second corresponds is 1 or 2.

Detailed Explanations are as Below.

In one implementation, when the octet(s) indicating beam failure recovery information for TRP(s) are present, the octet(s) indicating beam failure recovery information for TRP(s) occur based on the ascending order of the BFD-RS set identifiers or indices.

For example, octet(s) indicating the beam failure recovery information for TRP(s) with smaller BFD-RS set identifiers or indices occur first, and then octet(s) indicating the beam failure recovery information for TRP(s) with larger BFD-RS set identifiers or indices occur.

For example, octet(s) of beam failure recovery information for TRP(s) of a first BFD-RS set identifier or index occur first, and then octet(s) of beam failure recovery information for TRP(s) of a second BFD-RS set identifier or index occur, the first BFD-RS set identifier or index being smaller than the second BFD-RS set identifier or index.

In the embodiments of this disclosure, in the beam failure-related information of the beam failure recovery MAC CE, octet(s) of the secondary cell indicating beam failure recovery information for TRP(s) may be present, and octet(s) of the secondary cell indicating beam failure recovery information for TRP(s) and octet(s) of the special cell indicating beam failure recovery information for TRP(s) may not be present.

When the octet(s) of the special cell indicating beam failure recovery information for TRP(s) are present, the octet(s) of the special cell indicating beam failure recovery information for TRP(s) occur before the octet(s) of the secondary cell indicating beam failure recovery information for TRP(s).

For example, in a case where two TRPs of the special cell have triggered beam failure recovery and the beam failure recovery has not been successfully completed, the terminal equipment initiates a random access procedure on the special cell, and the beam failure-related information is reported to the network device in the random access procedure. For example, the BFR MAC CE containing the beam failure-related information is carried by Msg 3, and as Msg 3 is relatively small in size, it may only include the beam failure recovery information for TRP(s) of the special cell.

In another implementation, when the octet(s) indicating beam failure recovery information for TRP(s) are present, the octet(s) indicating beam failure recovery information for TRP(s) occur in an ascending order the serving cell indices (ServeCellIndex).

For example, octet(s) indicating beam failure recovery information for TRP(s) of secondary cells with smaller serving cell indices or associated with the secondary cells with smaller serving cell indices occur first, and then octet(s) indicating beam failure recovery information for TRP(s) of secondary cells with larger serving cell indices or associated with secondary cells with larger serving cell indices occur.

For example, octet(s) of a serving cell with a serving cell index 1 or beam failure recovery information for TRP(s) associated therewith occur first, and then octet(s) of a serving cell with a serving cell index 2 or beam failure recovery information for TRP(s) associated therewith occur, and so on.

In the embodiments of this disclosure, in the beam failure-related information of the beam failure recovery MAC CE, the number of the octet(s) indicating the beam failure recovery information for TRP(s) corresponding to a serving cell index may be one. That is, the number of octet(s) containing an AC field corresponding to a serving cell index may be one.

In this way, beam failure information of one set of BFR-RSs (one TRP) is allowed to be provided only.

In a further implementation, when the octet(s) indicating beam failure recovery information for TRP(s) are present, the octet(s) indicating beam failure recovery information for TRP(s) occur based on the ascending order of BFD-RS set identifiers or indices and the ascending order of the serving cell indices of the secondary cell. Hence, for the truncated enhanced BFR MAC CE, inclusion of the number of the octet(s) including an AC field (which may be 0) is maximized, while the size of the available grant is not exceeded.

For example, the octet(s) indicating beam failure recovery information for TRP(s) occur based on the ascending order of the BFD-RS set identifiers or indices first, and then based on the ascending order of the serving cell indices of the secondary cell. That is, the octet(s) indicating beam failure recovery information for TRP(s) are sorted based on two levels, wherein the first level is sorted based on the ascending order of the serving cell indices of the secondary cell, and the second level is sorted based on the ascending order of the BFD-RS set identifiers or indices. For example, after all octet(s) of the secondary cell with smaller serving cell indices indicating beam failure recovery information for TRP(s) or octet(s) indicating beam failure recovery information for TRP(s) associated with the secondary cell with smaller serving cell indices occur, octet(s) of the secondary cell with larger serving cell indices indicating beam failure recovery information for TRP(s) or octet(s) indicating beam failure recovery information for TRP(s) associated with the secondary cell with larger serving cell indices occur.

For example, after all octet(s) indicating beam failure recovery information for TRP(s) associated with a serving cell with a serving cell index 1 or a secondary cell with a serving cell index 1 occur, octet(s) indicating beam failure recovery information for TRP(s) associated with a secondary cell with a serving cell index 2 or a secondary cell with a serving cell index 2 occur, and so on. Wherein, for a serving cell index of a secondary cell, octet(s) of its corresponding beam failure recovery information for TRP(s) are arranged in the ascending order of the BFD-RS set identifiers or indices.

Or, the octet(s) indicating beam failure recovery information for TRP(s) occur first based on the ascending order of the serving cell indices of the secondary cell, and then occur based on the ascending order of the BFD-RS set identifiers or indices. That is, the octet(s) indicating beam failure recovery information for TRP(s) are sorted based on two levels, wherein the first level is sorted based on the ascending order of the BFD-RS set identifiers or indices, and the second level is sorted based on the ascending order of the serving cell indices of the secondary cell. For example, after all octet(s) indicating beam failure recovery information for TRP(s) of smaller BFD-RS set identifiers or indices occur, octet(s) indicating beam failure recovery information for TRP(s) of larger BFD-RS set identifiers or indices occur.

For example, after all octet(s) indicating beam failure recovery information for TRP(s) of a first BFD-RS set identifier or index occur, octet(s) indicating beam failure recovery information for TRP(s) of a second BFD-RS set identifier or index occur, the first BFD-RS set identifier or index being smaller than the second BFD-RS set identifier or index. Wherein, for the first BFD-RS set identifier or index, octet(s) of its corresponding beam failure recovery information for TRP(s) are arranged in the ascending order of the serving cell indices of the secondary cell, and for the second BFD-RS set identifier or index, octet(s) of its corresponding beam failure recovery information for TRP(s) are arranged in the ascending order of the serving cell indices of the secondary cell.

In the embodiments of this disclosure, for a special cell, when a BFD-RS set of the special cell detects a beam failure, the BFD-RS set of the special cell will be indicated in the beam failure recovery MAC CE and a result of the logical channel optimization (LCP) is that a UL-SCH resource available for transmission is insufficient to accommodate the beam failure recovery MAC CE containing a 4-octet first bitmap plus its subheader, the beam failure recovery MAC CE containing a 1-octet first bitmap is used to report the beam failure-related information.

That is, in the above case, in steps 601 and 602, the terminal equipment generates and transmits the beam failure recovery MAC CE containing a 1-octet first bitmap to the network device.

Thus, when the beam failure recovery MAC CE includes 2 bitmaps, a beam failure recovery MAC CE which contains a 1-octet bitmap may be determined for use in reporting the beam failure-related information.

In the embodiments of this disclosure, the beam failure recovery MAC CE may be included in an MAC PDU and taken as a part of the random access procedure.

For example, an MAC PDU may include at most one beam failure recovery MAC CE (BFR MAC CE) and/or an enhanced beam failure recovery MAC CE (enhanced BFR MAC CE).

In one implementation, the first bitmap indicates beam failure information associated with the first BFD-RS set.

For example, a BFD-RS set identifier or index of the first BFD-RS set is 0 or 1 or 2.

In this implementation, optionally, the beam failure recovery MAC CE containing a 1-octet first bitmap may also include a 1-octet second bitmap, the second bitmap being included in a next octet of the first bitmap.

For example, the second bitmap indicates beam failure information associated with the second BFD-RS set, and the BFD-RS set identifier or index of the second BFD-RS set is different from the BFD-RS set identifier or index of the first BFD-RS set. For example, the BFD-RS set identifier or index of the second BFD-RS set is greater than the BFD-RS set identifier or index of the first BFD-RS set.

A structure of the enhanced beam failure recovery MAC CE (enhanced BFR MAC CE) in this implementation shall be exemplarily described below.

The enhanced BFR MAC CE includes two sets of serving cell bitmaps. The first set of serving cell bitmaps indicates the failure information associated with the first BFD-RS set, and the second set of bitmaps indicates the failure information associated with the second BFD-RS set.

FIG. 7 is a schematic diagram of a (truncated) enhanced beam failure recovery MAC CE of an implementation of embodiment 1 of this disclosure. As shown in FIG. 7, the enhanced beam failure recovery MAC CE includes a 1-octet first bitmap and a 1-octet second bitmap, the second bitmap being included in a next octet of the first bitmap. The first bitmap indicates the beam failure information associated with the first BFD-RS set, and the second bitmap indicates the beam failure information associated with the second BFD-RS set.

For example, $C_i$ of a first octet may be replaced with $C_{1-i}$ or $C_{i-1}$, and $C_i$ of a second octet may be replaced with $C_{2-i}$ or $C_{i-2}$, or other similar forms.

FIG. 8 is another schematic diagram of the (truncated) enhanced beam failure recovery MAC CE of an implementation of embodiment 1 of this disclosure. As shown in FIG. 8, the enhanced beam failure recovery MAC CE includes a 4-octet first bitmap and a 4-octet second bitmap, the second bitmap being included in a next octet of the first bitmap. The first bitmap indicates the beam failure information associated with the first BFD-RS set, and the second bitmap indicates the beam failure information associated with the second BFD-RS set.

Wherein, for example, $C_i$ of the first to fourth octets may be replaced with $C_{1-i}$ or $C_{i-1}$, and $C_i$ of the fifth to eighth octets may be replaced with $C_{2-i}$ or $C_{i-2}$, or other similar forms.

In this implementation, assuming that in addition to the bitmap (such as former 2 octets in FIG. 7, or former 8 octets in FIG. 8), the UL resource is also able to accommodate 3 octets including an AC field, wherein beam failures are detected in the special cell and the two TRPs of the secondary cell $C_x$, where $7 > x >= 1$, then the truncated enhanced BFR MAC CE may include octet(s) indicating only the information associated with all BFD-RS set(s) of the special cell, or may include octet(s) indicating information associated with a part of the BFD-RS set(s) of the special cell and octet(s) indicating information associated with a part of BFD-RS set(s) of the secondary cell $C_x$, or may include octet(s) indicating information associated with all of the BFD-RS set(s) of the special cell and octet(s) indicating information associated with a part of BFD-RS set(s) of the secondary cell $C_x$. For example, option 1:2 octets including an AC field, in which the first octet indicates information associated with BFD-RS set 1 of the special cell, and the second octet indicates information associated with BFD-RS set 2 of the special cell;

option 2-1:2 octets including an AC field, in which the first octet indicates information associated with BFD-RS set 1 of the special cell, and the second octet indicates information associated with BFD-RS set 1 of the secondary cell $C_x$;

option 2-2:2 octets including an AC field, in which the first octet indicates information associated with BFD-RS set 2 of the special cell, and the second octet indicates information associated with BFD-RS set 2 of the secondary cell $C_x$;

option 2-3:2 octets including an AC field, in which the first octet indicates information associated with BFD-RS set 1 of the special cell, and the second octet indicates information associated with BFD-RS set i of the secondary cell $C_x$, wherein R bits indicate BFD-RS set i;

option 3-1:3 octets including an AC field, in which the first octet indicates information associated with BFD-RS set 1 of the special cell, the second octet indicates information associated with BFD-RS set 2 of the special cell, and the third octet indicates information associated with BFD-RS set 1 of the secondary cell $C_x$; and option 3-2:3 octets including an AC field, in which the first octet indicates information associated with BFD-RS set 1 of the special cell, the second octet indicates information associated with BFD-RS set 1 of the secondary cell $C_x$, and the third octet indicates information associated with BFD-RS set 2 of the special cell.

In still another implementation, the first bitmap may indicate a serving cell where a TRP beam failure is detected.

In yet another implementation, optionally, the beam failure recovery MAC CE containing a 1-octet first bitmap further includes a 1-octet second bitmap, the second bitmap being included in a next octet of the first bitmap.

For example, the second bitmap indicates the number of BFD-RS set(s) where a TRP beam failure is detected on the serving cell.

For example, the number of BFD-RS set(s) with failed TRP beams is 1 or 2, and is indicated by 0 or 1.

For example, 0 indicates that the number of BFD-RS set(s) where a TRP beam failure is detected is 1, and 1 indicates that the number of BFD-RS set(s) where a TRP beam failure is detected is 2, or 1 indicates that the number of BFD-RS set(s) where a TRP beam failure is detected is 1, and 0 indicates that the number of BFD-RS set(s) where a TRP beam failure is detected is 2.

In yet still another implementation, the second bitmap indicates the number of BFD-RS set(s) where a TRP beam failure is detected on the serving cell, where the serving cell may be any serving cell, or a serving cell configured with multiple TRP/BFD-RS set(s), or a serving cell where a TRP beam failure is detected.

For example, the serving cell is a serving cell where a TRP beam failure is detected.

A structure of the enhanced beam failure recovery MAC CE in the other implementation shall be exemplarily described below.

The enhanced BFR MAC CE includes a set of serving cell bitmaps and another set of bitmaps, which indicates the number of failed TRPs associated with serving cells (where beam failures are detected) configured with multiple TRP BFD/BFR. The serving cell bitmaps indicate serving cells where beam failures in BFD-RS set(s) are detected. Optionally, it further includes that 1 bit in octet(s) of the AC field indicates a failed TRP ID.

FIG. 9 is a further schematic diagram of the (truncated) enhanced beam failure recovery MAC CE of the other implementation of embodiment 1 of this disclosure. As shown in FIG. 9, the first octet is the serving cell bitmap, and the second octet is another set of bitmaps, which indicates the number of failed TRPs associated with serving cells configured with multiple TRP BFD/BFR, wherein when the Ci field is set to be 1, N fields corresponding thereto occur, N denoting the number of failed TRPs associated with the serving cells. In addition, optionally, when the Ci field is set to be 0, R bits may occur. Optionally, 1 bit in the octet(s) containing the AC field indicates the failed TRP ID. For example, the R bits in the octet(s) containing the AC field in FIG. 9 are replaced with TRP ID fields.

FIG. 10 is still another schematic diagram of the (truncated) enhanced beam failure recovery MAC CE of an implementation of embodiment 1 of this disclosure. As shown in FIG. 10, the first to fourth octet(s) are a set of serving cell bitmaps, and the fifth octet is another set of bitmaps, which indicates the number of failed TRPs associated with serving cells configured with multiple TRP BFD/BFR where beam failures are detected, wherein when the Ci field is set to be 1, N fields corresponding thereto occur, N denoting the number of failed TRPs associated with the serving cells. In addition, optionally, when the Ci field is set to be 0, R bits may occur. Optionally, 1 bit in the octet(s) containing the AC field indicates the failed TRP ID. For example, the R bits in the octet(s) containing the AC field in FIG. 10 are replaced with TRP ID fields.

In addition, in the enhanced beam failure recovery MAC CE shown in FIG. 10, the other set of bitmaps are 1-octet bitmaps; however, a multi-octet bitmap may also be used, such as a 2-octet bitmap, or a 3-octet bitmap, or a 4-octet bitmap.

In the other implementation, existing techniques are reused as much as possible, which makes less modifications to standards, and may reduce testing and other costs, thereby lowering costs.

It can be seen from the above embodiment that in the beam failure-related information of the beam failure recovery MAC CE reported to the network device, when octet(s) indicating beam failure recovery information for TRP(s) are present, the octet(s) indicating beam failure recovery information for TRP(s) occur based on an ascending order of BFD-RS set identifiers or indices and/or an ascending order of serving cell indices of the secondary cell. Therefore, the reported beam failure recovery information is TRP-specific, hence, at least one piece of beam failure recovery information for TRP(s) may be reported when multiple TRPs (such as two TRPs) of a cell detect beam failures, while satisfying the requirements of a size of a grant and maximizing inclusion of the beam failure recovery information.

Embodiment 2

The embodiment of this disclosure provides a method for reporting beam failure-related information, applicable to a terminal equipment.

FIG. 11 is a schematic diagram of the method for reporting beam failure-related information of embodiment 2 of this disclosure. As shown in FIG. 11, the method includes:

step 1101: generating a beam failure recovery MAC CE containing beam failure-related information; and step 1102: transmitting the beam failure recovery MAC CE to a network device to report the beam failure-related information, wherein, when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information.

That is, in the above case, in steps 1101 and 1102, the terminal equipment generates and transmits a beam failure recovery MAC CE containing a 1-octet first bitmap to the network device.

Hence, in a case where the beam failure recovery MAC CEs include two bitmaps, a beam failure recovery MAC CE which contains a 1-octet bitmap may be determined for use in reporting beam failure-related information.

In the embodiments of this disclosure, the beam failure recovery MAC CE (BFR MAC CE) may be an enhanced beam failure recovery MAC CE (enhanced BFR MAC CE) or an enhanced truncated beam failure recovery MAC CE (enhanced truncated BFR MAC CE). For example, reference may be made to the structure of the beam failure recovery MAC CE shown in FIGS. 8-10 for a structure of the BFR MAC CE (BFR MAC CE).

In the embodiments of this disclosure, the beam failure recovery MAC CE (BFR MAC CE) includes beam failure-related information, the beam failure-related information including beam failure information, and further including beam failure recovery information.

In the embodiments of this disclosure, the beam failure recovery information includes octet(s) indicating the beam failure recovery information for TRP(s). The octet(s) indicating beam failure recovery information for TRP(s) is, for example, octet(s) including an AC field.

In the embodiments of this disclosure, the beam failure information may also be referred to as octet(s) associated with the TRP beam failure information, such as octet(s) where a bitmap is located.

In the embodiments of this disclosure, the beam denotes a beam, which may be identified by reference signal (RS) information, such as an SSB index, and a CSI-RS resource ID, etc., and it may also be indicated by a TCI state of a channel, such as a TCI state ID, etc.

In the embodiments of this disclosure, "failure" may refer to "needing to be recovered", and these terms may be interchangeable.

In the embodiments of this disclosure, TRP(s), BFD-RS set(s) and control resource set pool(s) (coreset pool(s)) are corresponding to each other, and these terms may be interchangeable.

In the embodiments of this disclosure, "a beam failure is detected" may refer to "beam failure recovery is triggered", and these terms may be interchangeable.

For example, a cell may have 2 TRPs providing services to the terminal equipment, and each TRP is configured with a set of reference signals for beam failure detection, i.e. a BFD-RS set, that is, the TRP and the BFD-RS set are corresponding to each other.

In the embodiments of this disclosure, the beam failure recovery MAC CE may be included in an MAC PDU and taken as a part of the random access procedure.

For example, an MAC PDU may include at most one beam failure recovery MAC CE (BFR MAC CE) and/or an enhanced beam failure recovery MAC CE (enhanced BFR MAC CE).

In one implementation, the first bitmap indicates beam failure information associated with the first BFD-RS set.

For example, a BFD-RS set identifier or index of the first BFD-RS set is 0 or 1 or 2.

In this implementation, optionally, the beam failure recovery MAC CE containing a 1-octet first bitmap may also include a 1-octet second bitmap, the second bitmap being included in a next octet of the first bitmap.

For example, the second bitmap indicates beam failure information associated with the second BFD-RS set, and the BFD-RS set identifier or index of the second BFD-RS set is different from the BFD-RS set identifier or index of the first BFD-RS set. For example, the BFD-RS set identifier or index of the second BFD-RS set is greater than the BFD-RS set identifier or index of the first BFD-RS set.

In this implementation, the enhanced BFR MAC CE includes two sets of serving cell bitmaps. The first set of serving cell bitmaps indicates the failure information associated with the first BFD-RS set, and the second set of bitmaps indicates the failure information associated with the second BFD-RS set. Reference may be made to FIGS. 7 and

8 and embodiment 1 for particular examples of the enhanced BFR MAC CE, which shall not be repeated herein any further.

In this implementation, assuming that in addition to the bitmap (such as former 2 octets in FIG. 7, or former 8 octets in FIG. 8), the UL resource is also able to accommodate 3 octets including an AC field, wherein beam failures are detected in the special cell and the two TRPs of the secondary cell $C_x$, where $7 > x >= 1$, then the truncated enhanced BFR MAC CE may include octet(s) indicating only the information associated with all BFD-RS set(s) of the special cell, or may include octet(s) indicating information associated with a part of the BFD-RS set(s) of the special cell and octet(s) indicating information associated with a part of BFD-RS set(s) of the secondary cell $C_x$, or may include octet(s) indicating information associated with all of the BFD-RS set(s) of the special cell and octet(s) indicating information associated with a part of BFD-RS set(s) of the secondary cell $C_x$. Reference may be made to the disclosure contained in embodiment 1 for particular examples, which shall not be repeated herein any further.

In another implementation, the first bitmap may indicate a serving cell where a TRP beam failure is detected.

In another implementation, optionally, the beam failure recovery MAC CE containing a 1-octet first bitmap further includes a 1-octet second bitmap, the second bitmap being included in a next octet of the first bitmap.

For example, the second bitmap indicates the number of BFD-RS set(s) where a TRP beam failure is detected on the serving cell.

For example, the number of BFD-RS set(s) with failed TRP beams is 1 or 2, and is indicated by 0 or 1.

For example, 0 indicates that the number of BFD-RS set(s) where a TRP beam failure is detected is 1, and 1 indicates that the number of BFD-RS set(s) where a TRP beam failure is detected is 2, or 1 indicates that the number of BFD-RS set(s) where a TRP beam failure is detected is 1, and 0 indicates that the number of BFD-RS set(s) where a TRP beam failure is detected is 2.

In another implementation, the second bitmap indicates the number of BFD-RS set(s) where a TRP beam failure is detected on the serving cell, where the serving cell may be any serving cell, or a serving cell configured with multiple TRP/BFD-RS sets, or a serving cell where a TRP beam failure is detected.

For example, the serving cell is a serving cell where a TRP beam failure is detected.

In another implementation, the enhanced BFR MAC CE includes a set of serving cell bitmaps and another set of bitmaps, which indicates the number of failed TRPs associated with serving cells (where beam failures are detected) configured with multiple TRP BFD/BFR. The serving cell bitmaps indicate serving cells where beam failures in BFD-RS set(s) are detected. Furthermore, it includes that 1 bit in octet(s) of the AC field indicates a failed TRP ID. Reference may be made to FIGS. 9 and 10 and embodiment 1 for particular examples of the enhanced BFR MAC CE, which shall not be repeated herein any further.

In the other implementation, existing techniques are reused as much as possible, which makes less modifications to standards, and may reduce testing and other costs, thereby lowering costs.

It can be seen from the above embodiment that when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet first bitmap plus it subheader, a beam failure recovery MAC CE containing a 1-octet first bitmap is used to report the beam failure-related information. Hence, in a case where beam failure recovery MAC CEs include two bitmaps, a beam failure recovery MAC CE which contains a 1-octet bitmap may be determined for use in reporting beam failure-related information.

Embodiment 3

The embodiment of this disclosure provides an apparatus for reporting beam failure-related information, applicable to a terminal equipment. As a principle of the apparatus for solving problems is identical to that of the method in embodiment 1, reference may be made to the implementation of the method in embodiment 1 for implementation of the apparatus, with identical contents being not going to be repeated herein any further.

FIG. 12 is a schematic diagram of the apparatus for reporting beam failure-related information of embodiment 3 of this disclosure. As shown in FIG. 12, an apparatus 1200 includes:

a first generating unit 1201 configured to generate a beam failure recovery MAC CE (BFR MAC CE) containing beam failure-related information; and a first transmitting unit 1202 configured to transmit the beam failure recovery MAC CE to a network device to report the beam failure-related information, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

In the embodiments of this disclosure, when the octet(s) indicating the beam failure recovery information for TRP(s) are present, the octet(s) indicating the beam failure recovery information for TRP(s) occur based on an ascending order of BFD-RS set identifiers or indices, wherein octet(s) indicating the beam failure recovery information for TRP(s) with smaller BFD-RS set identifiers or indices occur first, and then octet(s) indicating the beam failure recovery information for TRP(s) with larger BFD-RS set identifiers or indices occur.

For example, when two TRPs of the special cell trigger beam failure recovery and the beam failure recovery has not been successfully completed, the terminal equipment initiates a random access procedure on the special cell, and the beam failure-related information is reported to the network device during the random access procedure.

In the embodiments of this disclosure, when the octet(s) indicating beam failure recovery information for TRP(s) are present, the octet(s) indicating beam failure recovery information for TRP(s) occur based on an ascending order of serving cell indices of the secondary cell, wherein octet(s) indicating beam failure recovery information for TRP(s) of secondary cells with smaller serving cell indices or associated with the secondary cells with smaller serving cell indices occur first, and then octet(s) indicating beam failure recovery information for TRP(s) of secondary cells with larger serving cell indices or associated with secondary cells with larger serving cell indices occur.

In the embodiments of this disclosure, in the beam failure-related information of the beam failure recovery MAC CE, the number of the octet(s) indicating the beam failure recovery information for TRP(s) corresponding to a serving cell index may be one.

In the embodiments of this disclosure, when the octet(s) indicating the beam failure recovery information for TRP(s) are present, the octet(s) indicating the beam failure recovery information for TRP(s) may occur based on an ascending order of BFD-RS set identifiers or indices and an ascending order of the serving cell indices of the secondary cell, wherein the octet(s) indicating the beam failure recovery information for TRP(s) occur first based on the ascending order of the BFD-RS set identifiers or indices, and then based on the ascending order of the serving cell indices of the secondary cells, or, the octet(s) indicating the beam failure recovery information for TRP(s) occur first based on the ascending order of the serving cell indices of the secondary cells, and then based on the ascending order of the BFD-RS set identifiers or indices.

For example, that the octet(s) indicating the beam failure recovery information for TRP(s) occur first based on the ascending order of the BFD-RS set identifiers or indices, and then based on the ascending order of the serving cell indices of the secondary cells, comprises that: after all the octet(s) indicating the beam failure recovery information for TRP(s) of the secondary cells with smaller serving cell indices or associated with the secondary cells with smaller serving cell indices occur, the octet(s) indicating beam failure recovery information for TRP(s) of the secondary cells with larger serving cell indices or associated with the secondary cells with larger serving cell indices occur.

For example, that the octet(s) indicating the beam failure recovery information for TRP(s) occur first based on the ascending order of the serving cell indices of the secondary cells, and then based on the ascending order of the BFD-RS set identifiers or indices, comprises that: after all octet(s) indicating the beam failure recovery information for TRP(s) of smaller BFD-RS set identifiers or indices occur, octet(s) indicating beam failure recovery information for TRP(s) of larger BFD-RS set identifiers or indices occur.

For example, the octet(s) indicating the beam failure recovery information for TRP(s) indicate beam failure recovery information for TRP(s) of the secondary cell.

In the embodiments of this disclosure, when a BFD-RS set of a special cell detects a beam failure, the BFD-RS set of the special cell is to be indicated in the beam failure recovery MAC CE and a result of logical channel optimization (LCP) is that UL-SCH resources available for transmission are insufficient for accommodating a beam failure recovery MAC CE containing a first bitmap of 4 octets plus its header, a beam failure recovery MAC CE containing a first bitmap of 1 octet is used to report the beam failure-related information.

In the embodiments of this disclosure, the first bitmap may indicate beam failure information with which a first BFD-RS set is associated.

For example, a BFD-RS set identifier or index of the first BFD-RS set is 0 or 1 or 2.

In the embodiments of this disclosure, the beam failure recovery MAC CE containing a 1-octet first bitmap may also include a 1-octet second bitmap, the second bitmap being included in a next octet of the first bitmap.

In the embodiments of this disclosure, the second bitmap may indicate beam failure information associated with the second BFD-RS set, and the BFD-RS set identifier or index of the second BFD-RS set is different from the BFD-RS set identifier or index of the first BFD-RS set.

In the embodiments of this disclosure, the first bitmap may also indicate a serving cell where a TRP beam failure is detected.

In the embodiments of this disclosure, the beam failure recovery MAC CE containing a first bitmap of 1 octet may further contain a second bitmap of 1 octet, the second bitmap being comprised in a next octet of the first bitmap.

In the embodiments of this disclosure, the second bitmap may also indicate the number of BFD-RS set(s) where a TRP beam failure is detected on the serving cell.

For example, the number of BFD-RS set(s) with failed TRP beams is 1 or 2, and is indicated by 0 or 1.

For example, 0 indicates that the number of BFD-RS set(s) where a TRP beam failure is detected is 1, and 1 indicates that the number of BFD-RS set(s) where a TRP beam failure is detected is 2, or 1 indicates that the number of BFD-RS set(s) where a TRP beam failure is detected is 1, and 0 indicates that the number of BFD-RS set(s) where a TRP beam failure is detected is 2.

For example, the serving cell is a serving cell where a TRP beam failure is detected.

For example, the beam failure recovery MAC CE is included in an MAC PDU and taken as a part of the random access procedure.

For example, an MAC PDU includes at most one beam failure recovery MAC CE (BFR MAC CE) and/or an enhanced beam failure recovery MAC CE (enhanced BFR MAC CE).

In the embodiments of this disclosure, the beam failure recovery MAC CE may be an enhanced beam failure recovery MAC CE (enhanced BFR MAC CE) or an enhanced truncated beam failure recovery MAC CE (enhanced truncated BFR MAC CE).

In the embodiments of this disclosure, reference may be made to related steps in embodiment 1 for specific functions of the above units, which shall not be repeated herein any further.

It can be seen from the above embodiment that in the beam failure-related information of the beam failure recovery MAC CE reported to the network device, when octet(s) indicating beam failure recovery information for TRP(s) are present, the octet(s) indicating beam failure recovery information for TRP(s) occur based on an ascending order of BFD-RS set identifiers or indices and/or an ascending order of serving cell indices of the secondary cell. Therefore, the reported beam failure recovery information is TRP-specific, hence, at least one piece of beam failure recovery information for TRP(s) may be reported when multiple TRPs (such as two TRPs) of a cell detect beam failures, while satisfying the requirements of a size of a grant and maximizing inclusion of the beam failure recovery information.

Embodiment 4

The embodiment of this disclosure provides an apparatus for reporting beam failure-related information, applicable to a terminal equipment. As a principle of the apparatus for solving problems is identical to that of the method in embodiment 2, reference may be made to the implementation of the method in embodiment 2 for implementation of the apparatus, with identical contents being not going to be repeated herein any further.

Figure 13:
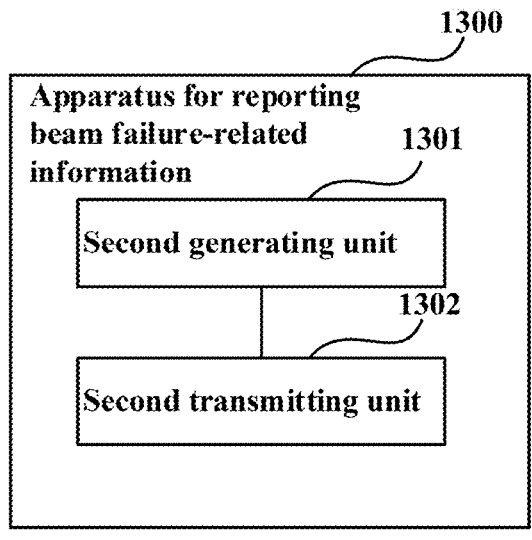
FIG. 13 is a schematic diagram of the apparatus for reporting beam failure-related information of embodiment 4 of this disclosure.

FIG. 13 is a schematic diagram of the apparatus for reporting beam failure-related information of embodiment 4 of this disclosure. As shown in FIG. 13, an apparatus 1300 includes:

a second generating unit 1301 configured to generate a beam failure recovery MAC CE containing beam failure-related information; and a second transmitting unit 1302 configured to transmit the beam failure recovery MAC CE to a network device to report the beam failure-related information, wherein, when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information.

In the embodiments of this disclosure, the first bitmap may indicate beam failure information associated with the first BFD-RS set.

For example, a BFD-RS set identifier or index of the first BFD-RS set is 0 or 1 or 2.

In the embodiments of this disclosure, the beam failure recovery MAC CE containing a 1-octet first bitmap may also include a 1-octet second bitmap, the second bitmap being included in a next octet of the first bitmap.

In the embodiments of this disclosure, the second bitmap may indicate beam failure information associated with the second BFD-RS set, and the BFD-RS set identifier or index of the second BFD-RS set is different from the BFD-RS set identifier or index of the first BFD-RS set.

In the embodiments of this disclosure, the first bitmap may also indicate a serving cell where a TRP beam failure is detected.

In the embodiments of this disclosure, the beam failure recovery MAC CE containing a 1-octet first bitmap further includes a 1-octet second bitmap, the second bitmap being included in a next octet of the first bitmap.

In the embodiments of this disclosure, the second bitmap may also indicate the number of BFD-RS set(s) where a TRP beam failure is detected on the serving cell.

For example, the number of BFD-RS set(s) with failed TRP beams is 1 or 2, and is indicated by 0 or 1.

For example, 0 indicates that the number of BFD-RS set(s) where a TRP beam failure is detected is 1, and 1 indicates that the number of BFD-RS set(s) where a TRP beam failure is detected is 2, or 1 indicates that the number of BFD-RS set(s) where a TRP beam failure is detected is 1, and 0 indicates that the number of BFD-RS set(s) where a TRP beam failure is detected is 2.

For example, the serving cell is a serving cell where a TRP beam failure is detected.

For example, the beam failure recovery MAC CE is included in an MAC PDU and taken as a part of the random access procedure.

For example, an MAC PDU includes at most one beam failure recovery MAC CE (BFR MAC CE) and/or an enhanced beam failure recovery MAC CE (enhanced BFR MAC CE).

In the embodiments of this disclosure, the beam failure recovery MAC CE may be an enhanced beam failure recovery MAC CE (enhanced BFR MAC CE) or an enhanced truncated beam failure recovery MAC CE (enhanced truncated BFR MAC CE).

In the embodiments of this disclosure, reference may be made to related steps in embodiment 2 for specific functions of the above units, which shall not be repeated herein any further.

It can be seen from the above embodiment that when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet first bitmap plus it subheader, a beam failure recovery MAC CE containing a 1-octet first bitmap is used to report the beam failure-related information. Hence, in a case where beam failure recovery MAC CEs include two bitmaps, a beam failure recovery MAC CE which contains a 1-octet bitmap may be determined for use in reporting beam failure-related information.

Embodiment 5

The embodiment of this disclosure provides a terminal equipment, including the apparatus for reporting beam failure-related information as described in embodiment 3 or 4.

Figure 14:
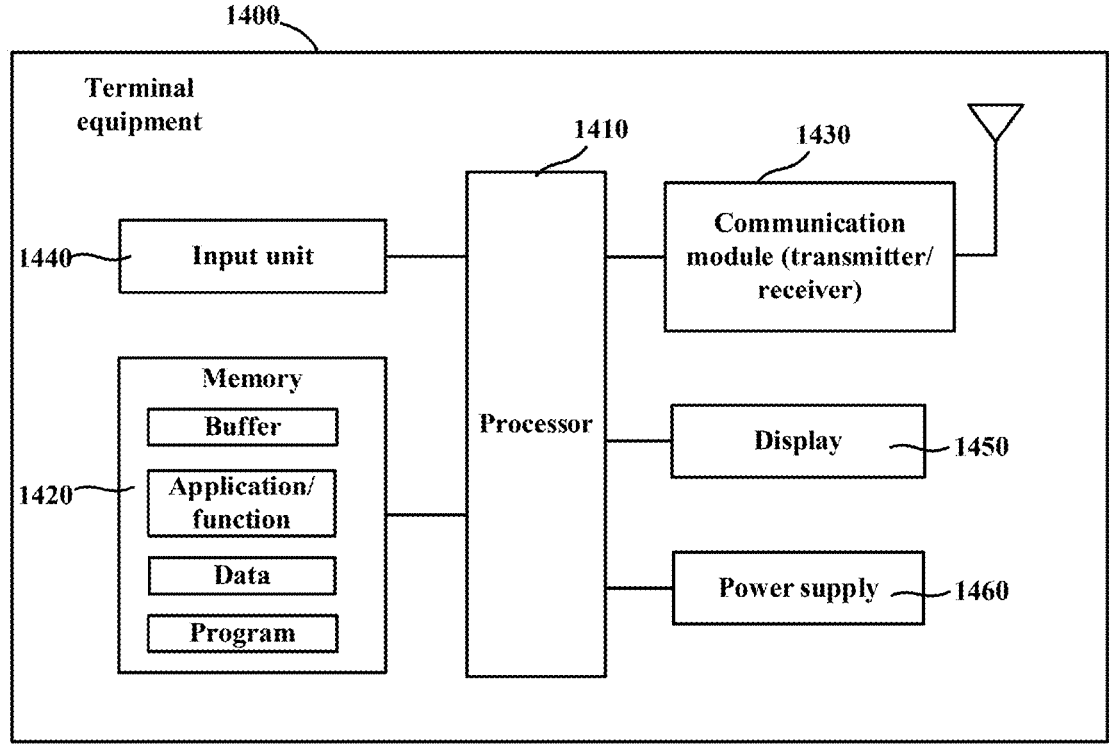
FIG. 14 is a block diagram of a systematic structure of the terminal equipment of embodiment 5 of this disclosure.

FIG. 14 is a block diagram of a systematic structure of the terminal equipment of embodiment 5 of this disclosure. As shown in FIG. 14, a terminal equipment 1400 may include a processor 1410 and a memory 1420, the memory 1420 being coupled to the processor 1410. It should be noted that this figure is illustrative only, and other types of structures may also be used, so as to supplement or replace this structure and achieve a telecommunications function or other functions.

In one implementation, functions of the apparatus for reporting beam failure-related information may be integrated into the processor 1410.

For example, the processor 1410 may be configured to: generate a beam failure recovery MAC CE containing beam failure-related information; and transmit the beam failure recovery MAC CE to a network device to report the beam failure-related information, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

Or, the processor 1410 may be configured to: generate a beam failure recovery MAC CE containing beam failure-related information; and transmit the beam failure recovery MAC CE to a network device to report the beam failure-related information, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information.

In another implementation, the apparatus for reporting beam failure-related information and the processor 1410 may be configured separately; for example, the apparatus for reporting beam failure-related information may be configured as a chip connected to the processor 1410, and the functions of the apparatus for reporting beam failure-related information are executed under control of the processor 1410.

As shown in FIG. 14, the terminal equipment 1400 may further include a communication module 1430, an input unit 1440, a display 1450, and a power supply 1460. It should be noted that the terminal equipment 1400 does not necessarily include all the parts shown in FIG. 14, and furthermore, the terminal equipment 1400 may include parts not shown in FIG. 14, and the related art may be referred to.

As shown in FIG. 14, the processor 1410 is sometimes referred to as a controller or an operational control, which may include a microprocessor or other processor devices and/or logic devices. The processor 1410 receives input and controls operations of components of the terminal equipment 1400.

Wherein, the memory 1420 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1410 may execute programs stored in the memory 1420, so as to realize information storage or processing, etc. Functions of other parts are similar to those of the related art, which shall not be described herein any further. The parts of the terminal equipment 1400 may be realized by specific hardware, firmware, software, or any combination thereof, without departing from the scope of this disclosure.

It can be seen from the above embodiment that in the beam failure-related information of the beam failure recovery MAC CE reported to the network device, when octet(s) indicating beam failure recovery information for TRP(s) are present, the octet(s) indicating beam failure recovery information for TRP(s) occur based on an ascending order of BFD-RS set identifiers or indices and/or an ascending order of serving cell indices of the secondary cell. Therefore, the reported beam failure recovery information is TRP-specific, hence, at least one piece of beam failure recovery information for TRP(s) may be reported when multiple TRPs (such as two TRPs) of a cell detect beam failures, while satisfying the requirements of a size of a grant and maximizing inclusion of the beam failure recovery information.

In addition, when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet first bitmap plus it subheader, a beam failure recovery MAC CE containing a 1-octet first bitmap is used to report the beam failure-related information. Hence, in a case where beam failure recovery MAC CEs include two bitmaps, a beam failure recovery MAC CE which contains a 1-octet bitmap may be determined for use in reporting beam failure-related information.

Embodiment 6

The embodiment of this disclosure provides a method for receiving beam failure-related information, applicable to a network device. This method corresponds to the method for reporting beam failure-related information in embodiment 1 or 2, and reference may be made to the disclosure contained in embodiments 1 and 2 for specific contents, which shall not be repeated herein any further.

Figures 15, 16:
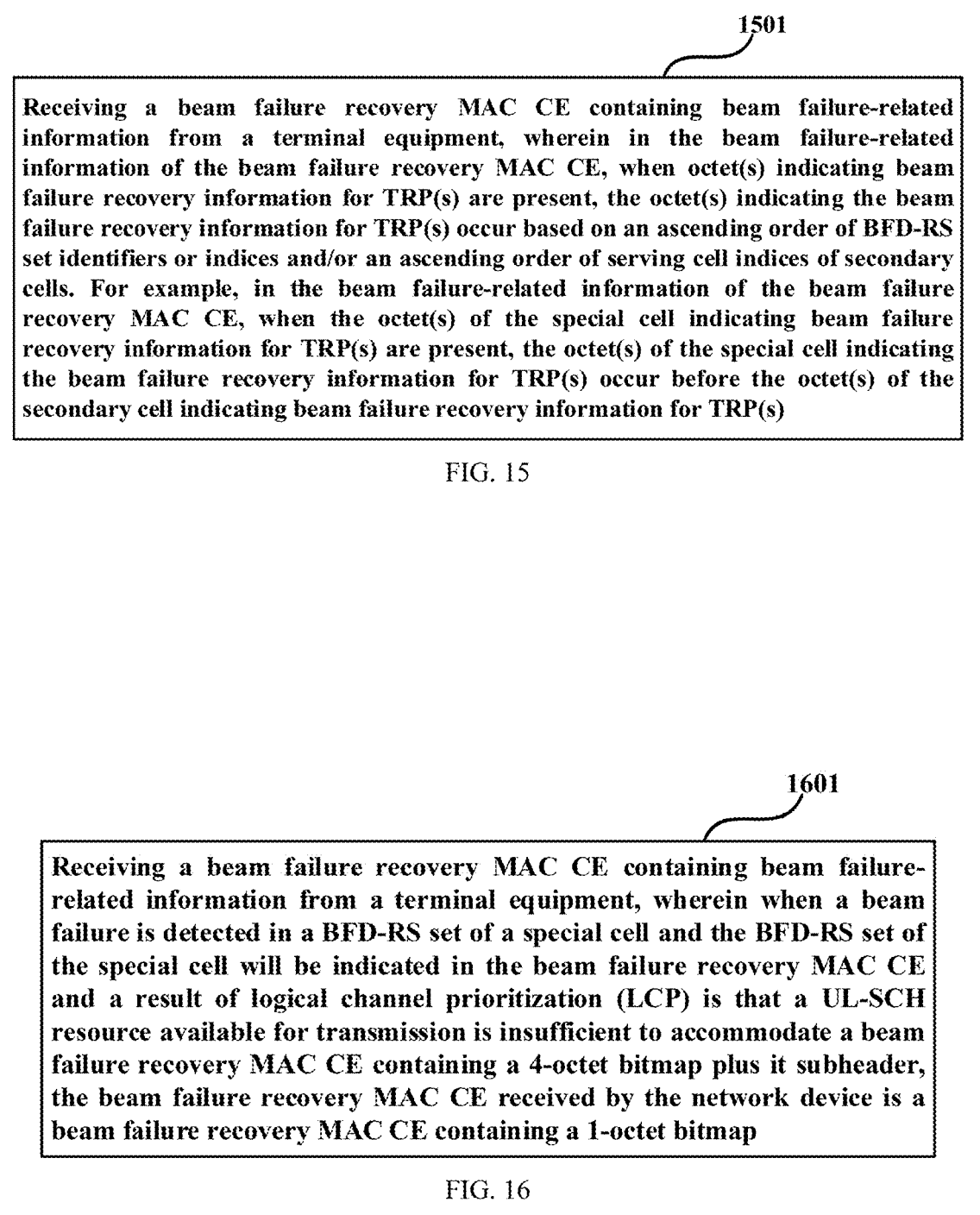

FIG. 15 is a schematic diagram of the method for receiving beam failure-related information of embodiment 6 of this disclosure. As shown in FIG. 15, the method includes:

step 1501: receiving a beam failure recovery MAC CE containing beam failure-related information from a terminal equipment, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells. For example, in the beam failure-related information of the beam failure recovery MAC CE, when the octet(s) of the special cell indicating beam failure recovery information for TRP(s) are present, the octet(s) of the special cell indicating the beam failure recovery information for TRP(s) occur before the octet(s) of the secondary cell indicating beam failure recovery information for TRP(s).

Furthermore, when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the terminal equipment uses a beam failure recovery MAC CE containing a 1-octet bitmap to report the beam failure-related information, that is, the beam failure recovery MAC CE received by the network device is a beam failure recovery MAC CE containing a 1-octet bitmap.

FIG. 16 is another schematic diagram of the method for receiving beam failure-related information of embodiment 6 of this disclosure. As shown in FIG. 16, the method includes:

step 1601: receiving a beam failure recovery MAC CE containing beam failure-related information from a terminal equipment, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap.

For example, the first bitmap indicates beam failure information associated with the first BFD-RS set.

For example, the first bitmap indicates a serving cell where a TRP beam failure is detected.

In the embodiments of this disclosure, reference may be made to the disclosure contained in embodiments 1 and 2 for specific contents of the beam failure recovery MAC CE and the beam failure-related information, which shall not be repeated herein any further.

It can be seen from the above embodiment that in the beam failure-related information of the beam failure recovery MAC CE reported to the network device, when octet(s) indicating beam failure recovery information for TRP(s) are present, the octet(s) indicating beam failure recovery information for TRP(s) occur based on an ascending order of BFD-RS set identifiers or indices and/or an ascending order of serving cell indices of the secondary cell. Therefore, the reported beam failure recovery information is TRP-specific, hence, at least one piece of beam failure recovery information for TRP(s) may be reported when multiple TRPs (such as two TRPs) of a cell detect beam failures, while satisfying the requirements of a size of a grant and maximizing inclusion of the beam failure recovery information.

Embodiment 7

The embodiment of this disclosure provides an apparatus for receiving beam failure-related information, applicable to a network device. As a principle of the apparatus for solving problems is identical to that of the method in embodiment 6, reference may be made to the implementation of the method in embodiment 6 for implementation of the apparatus, with identical contents being not going to be repeated herein any further.

Figure 17:
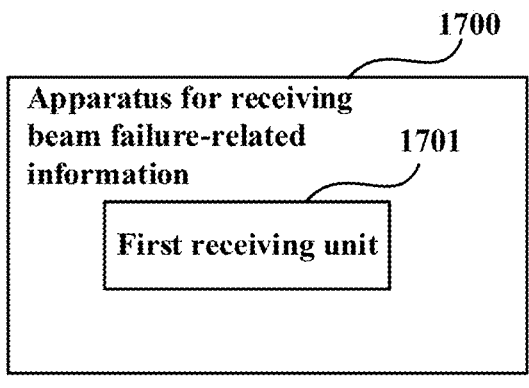
FIG. 17 is a schematic diagram of the apparatus for receiving beam failure-related information of embodiment 7 of this disclosure.

FIG. 17 is a schematic diagram of the apparatus for receiving beam failure-related information of embodiment 7 of this disclosure. As shown in FIG. 17, an apparatus 1700 includes:

a first receiving unit 1701 configured to receive a beam failure recovery MAC CE containing beam failure-related information from a terminal equipment, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

For example, in the beam failure-related information of the beam failure recovery MAC CE, when the octet(s) of the special cell indicating beam failure recovery information for TRP(s) are present, the octet(s) of the special cell indicating the beam failure recovery information for TRP(s) occur before the octet(s) of the secondary cell indicating beam failure recovery information for TRP(s).

Furthermore, when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the terminal equipment uses a beam failure recovery MAC CE containing a 1-octet bitmap to report the beam failure-related information, that is, the beam failure recovery MAC CE received by the network device is a beam failure recovery MAC CE containing a 1-octet bitmap.

Figure 18:
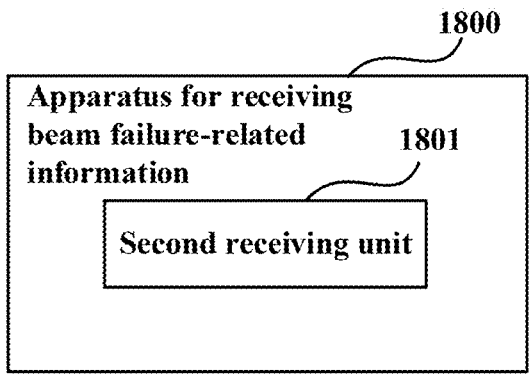
FIG. 18 is another schematic diagram of the apparatus for receiving beam failure-related information of embodiment 7 of this disclosure.

FIG. 18 is another schematic diagram of the apparatus for receiving beam failure-related information of embodiment 6 of this disclosure. As shown in FIG. 18, an apparatus 1800 includes:

a second receiving unit 1801 configured to receive a beam failure recovery MAC CE containing beam failure-related information from a terminal equipment, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap.

For example, the first bitmap indicates beam failure information associated with the first BFD-RS set.

For example, the first bitmap indicates a serving cell where a TRP beam failure is detected.

In the embodiments of this disclosure, reference may be made to the disclosure contained in embodiments 1 and 2 for specific contents of the beam failure recovery MAC CE and the beam failure-related information, which shall not be repeated herein any further.

It can be seen from the above embodiment that in the beam failure-related information of the beam failure recovery MAC CE reported to the network device, when octet(s) indicating beam failure recovery information for TRP(s) are present, the octet(s) indicating beam failure recovery information for TRP(s) occur based on an ascending order of BFD-RS set identifiers or indices and/or an ascending order of serving cell indices of the secondary cell. Therefore, the reported beam failure recovery information is TRP-specific, hence, at least one piece of beam failure recovery information for TRP(s) may be reported when multiple TRPs (such as two TRPs) of a cell detect beam failures, while satisfying the requirements of a size of a grant and maximizing inclusion of the beam failure recovery information.

Embodiment 8

The embodiment of this disclosure provides a network device, including the apparatus for reporting beam failure-related information as described in embodiment 7.

Figure 19:
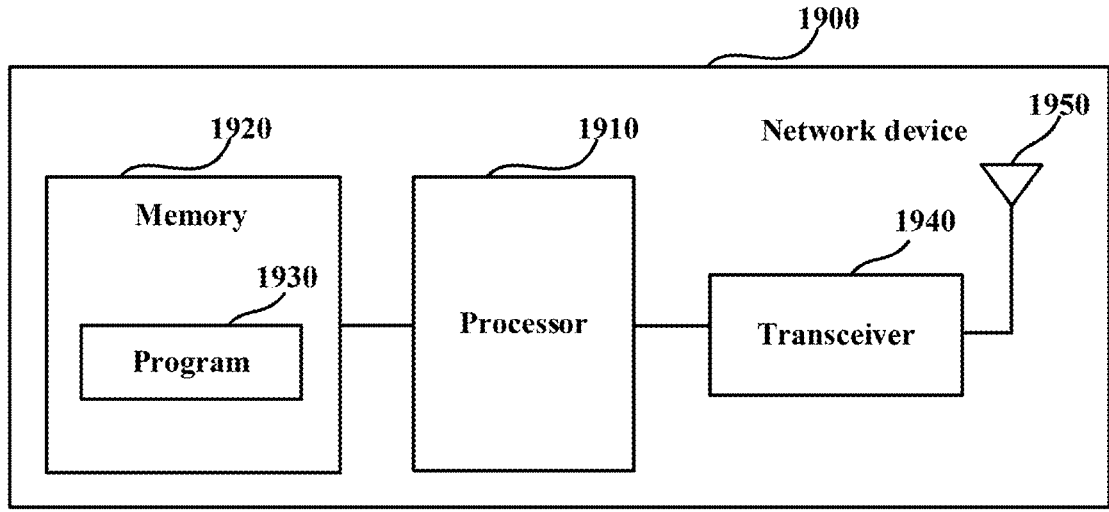
FIG. 19 is a block diagram of a systematic structure of the network device of embodiment 8 of this disclosure.

FIG. 19 is a block diagram of a systematic structure of the network device of embodiment 8 of this disclosure. As shown in FIG. 19, a network device 1900 may include a processor 1910 and a memory 1920, the memory 1920 being coupled to the processor 1910. Wherein, the memory 1920 may store various data, and furthermore, it may store a program 1930 for information processing, and execute the program 1930 under control of the processor 1910, so as to receive various information transmitted by a terminal equipment, and transmit various information to the terminal equipment.

In one implementation, the functions of the apparatus for reporting beam failure-related information may be integrated into the processor 1910. Wherein, the processor 1910 may be configured to: receive a beam failure recovery MAC CE containing beam failure-related information from a terminal equipment, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

Or, the processor 1910 may also be configured to: receive a beam failure recovery MAC CE containing beam failure-related information from a terminal equipment, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap.

In another implementation, the apparatus for reporting beam failure-related information and the processor 1910 may be configured separately; for example, the apparatus for reporting beam failure-related information may be configured as a chip connected to the processor 1910, and the functions of the apparatus for reporting beam failure-related information are executed under control of the processor 1910.

Furthermore, as shown in FIG. 19, the network device 1900 may include a transceiver 1940, and an antenna 1950, etc. Wherein, functions of the above components are similar to those in the related art, and shall not be described herein any further. It should be noted that the network device 1900 does not necessarily include all the parts shown in FIG. 19, and furthermore, the network device 1900 may include parts not shown in FIG. 19, and the related art may be referred to.

It can be seen from the above embodiment that in the beam failure-related information of the beam failure recovery MAC CE reported to the network device, when octet(s) indicating beam failure recovery information for TRP(s) are present, the octet(s) indicating beam failure recovery information for TRP(s) occur based on an ascending order of BFD-RS set identifiers or indices and/or an ascending order of serving cell indices of the secondary cell. Therefore, the reported beam failure recovery information is TRP-specific, hence, at least one piece of beam failure recovery information for TRP(s) may be reported when multiple TRPs (such as two TRPs) of a cell detect beam failures, while satisfying the requirements of a size of a grant and maximizing inclusion of the beam failure recovery information.

Embodiment 9

The embodiment of this disclosure provides a communication system, including the terminal equipment described in embodiment 5 and/or the network device described in embodiment 8, and reference may be made to the disclosure contained in embodiments 1-8 for details.

For example, reference may be made to FIG. 3 for a structure of the communication system. As shown in FIG. 3, the communication system 100 includes the network device 101 and the terminal equipment 102. The terminal equipment 102 may be identical to the terminal equipment described in embodiment 5, and the network device 101 may be identical to the network device described in embodiment 8, with repeated parts being not going to be described herein any further.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 12 or 13 may either correspond to software modules of procedures of a computer program, or correspond to hardware modules. Such software modules may respectively correspond to the steps shown in FIG. 6 or 11. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 12 or 13 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 12 or 13 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.
Supplement I 1. An apparatus for reporting beam failure-related information, the apparatus being applicable to a terminal equipment, and the apparatus including:
a first generating unit configured to generate a beam failure recovery MAC CE (BFR MAC CE) containing beam failure-related information; and
a first transmitting unit configured to transmit the beam failure recovery MAC CE to a network device to report the beam failure-related information,
wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

2. The apparatus according to supplement 1, wherein, when the octet(s) indicating the beam failure recovery information for TRP(s) are present, the octet(s) indicating the beam failure recovery information for TRP(s) occur based on an ascending order of BFD-RS set identifiers or indices, wherein,
octet(s) indicating the beam failure recovery information for TRP(s) with smaller BFD-RS set identifiers or indices occur first, and then octet(s) indicating the beam failure recovery information for TRP(s) with larger BFD-RS set identifiers or indices occur.

3. The apparatus according to supplement 1 or 2, wherein, in the beam failure-related information of the beam failure recovery MAC CE, when octet(s) of a special cell indicating beam failure recovery information for TRP(s) are present, the octet(s) indicating the beam failure recovery information for TRP(s) of the special cell occur earlier than octet(s) of the secondary cells indicating the beam failure recovery information for TRP(s).

4. The apparatus according to supplement 3, wherein, when two TRPs of the special cell trigger beam failure recovery and the beam failure recovery has not been successfully completed, the terminal equipment initiates a random access procedure on the special cell, and the beam failure-related information is reported to the network device during the random access procedure.

5. The apparatus according to any one of supplements 1, 3 and 4, wherein,
when the octet(s) indicating beam failure recovery information for TRP(s) are present, the octet(s) indicating beam failure recovery information for TRP(s) occur based on an ascending order of serving cell indices of the secondary cell, wherein,
octet(s) indicating beam failure recovery information for TRP(s) of secondary cells with smaller serving cell indices or associated with the secondary cells with smaller serving cell indices occur first, and then octet(s) indicating beam failure recovery information for TRP(s) of secondary cells with larger serving cell indices or associated with secondary cells with larger serving cell indices occur.

6. The apparatus according to supplement 1 or 5, wherein, in the beam failure-related information of the beam failure recovery MAC CE, the number of the octet(s) indicating the beam failure recovery information for TRP(s) corresponding to a serving cell index is one.

7. The apparatus according to any one of supplements 1-4, wherein,
when the octet(s) indicating the beam failure recovery information for TRP(s) are present, the octet(s) indicating the beam failure recovery information for TRP(s) occur based on an ascending order of BFD-RS set identifiers or indices and an ascending order of the serving cell indices of the secondary cell, wherein,
the octet(s) indicating the beam failure recovery information for TRP(s) occur first based on the ascending order of the BFD-RS set identifiers or indices, and then based on the ascending order of the serving cell indices of the secondary cells, or,
the octet(s) indicating the beam failure recovery information for TRP(s) occur first based on the ascending order of the serving cell indices of the secondary cells, and then based on the ascending order of the BFD-RS set identifiers or indices.

8. The apparatus according to supplement 7, wherein that the octet(s) indicating the beam failure recovery information for TRP(s) occur first based on the ascending order of the BFD-RS set identifiers or indices, and then based on the ascending order of the serving cell indices of the secondary cells, includes that:
after all the octet(s) indicating the beam failure recovery information for TRP(s) of the secondary cells with smaller serving cell indices or associated with the secondary cells with smaller serving cell indices occur, the octet(s) indicating beam failure recovery information for TRP(s) of the secondary cells with larger serving cell indices or associated with the secondary cells with larger serving cell indices occur.

9. The apparatus according to supplement 7, wherein that the octet(s) indicating the beam failure recovery information for TRP(s) occur first based on the ascending order of the serving cell indices of the secondary cells, and then based on the ascending order of the BFD-RS set identifiers or indices, includes that:

after all octet(s) indicating the beam failure recovery information for TRP(s) of smaller BFD-RS set identifiers or indices occur, octet(s) indicating beam failure recovery information for TRP(s) of larger BFD-RS set identifiers or indices occur.

10. The apparatus according to any one of supplements 1, 2 and 5-9, wherein, the octet(s) indicating the beam failure recovery information for TRP(s) indicate beam failure recovery information for TRP(s) of the secondary cell.

11. The apparatus according to any one of supplements 1-10, wherein, when a BFD-RS set of a special cell detects a beam failure, the BFD-RS set of the special cell is to be indicated in the beam failure recovery MAC CE and a result of logical channel optimization (LCP) is that UL-SCH resources available for transmission are insufficient for accommodating a beam failure recovery MAC CE containing a first bitmap of 4 octets plus its header, a beam failure recovery MAC CE containing a first bitmap of 1 octet is used to report the beam failure-related information.

12. The apparatus according to supplement 11, wherein, the first bitmap indicates beam failure information with which a first BFD-RS set is associated.

13. The apparatus according to supplement 12, wherein, a BFD-RS set identifier or index of the first BFD-RS set is 0 or 1 or 2.

14. The apparatus according to any one of supplements 11-13, wherein, the beam failure recovery MAC CE containing a first bitmap of 1 octet further contains a second bitmap of 1 octet, the second bitmap being included in a next octet of the first bitmap.

15. The apparatus according to supplement 14, wherein, the second bitmap indicates beam failure information with which a second BFD-RS set is associated, a BFD-RS set identifier or index of the second BFD-RS set being different from the BFD-RS set identifier or index of the first BFD-RS set.

16. The apparatus according to supplement 11, wherein, the first bitmap indicates a serving cell where a TRP beam failure is detected.

17. The apparatus according to supplement 16, wherein, the beam failure recovery MAC CE containing a first bitmap of 1 octet further contains a second bitmap of 1 octet, the second bitmap being included in a next octet of the first bitmap.

18. The apparatus according to supplement 17, wherein, the second bitmap indicates the number of BFD-RS set(s) where a TRP beam failure is detected on the serving cell.

19. The apparatus according to supplement 18, wherein, the number of BFD-RS set(s) with failed TRP beams is 1 or 2, and is indicated by 0 or 1.

20. The apparatus according to supplement 19, wherein, 0 indicates that the number of BFD-RS set(s) where a TRP beam failure is detected is 1, and 1 indicates that the number of BFD-RS set(s) where a TRP beam failure is detected is 2, or 1 indicates that the number of BFD-RS set(s) where a TRP beam failure is detected is 1, and 0 indicates that the number of BFD-RS set(s) where a TRP beam failure is detected is 2.

21. The apparatus according to any one of supplements 18-20, wherein, the serving cell is a serving cell where a TRP beam failure is detected.

22. The apparatus according to any one of supplements 11-21, wherein, the beam failure recovery MAC CE is included in an MAC PDU and taken as a part of the random access procedure.

22a. The apparatus according to supplement 22, wherein, an MAC PDU includes at most one beam failure recovery MAC CE (BFR MAC CE) and/or an enhanced beam failure recovery MAC CE (enhanced BFR MAC CE).

23. The apparatus according to any one of supplements 1-22, wherein, the beam failure recovery MAC CE is an enhanced beam failure recovery MAC CE (enhanced BFR MAC CE) or an enhanced truncated beam failure recovery MAC CE (enhanced truncated BFR MAC CE).

24. An apparatus for reporting beam failure-related information, the apparatus being applicable to a terminal equipment, and the apparatus including:

a second generating unit configured to generate a beam failure recovery MAC CE containing beam failure-related information; and a second transmitting unit configured to transmit the beam failure recovery MAC CE to a network device to report the beam failure-related information, wherein, when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information.

25. The apparatus according to supplement 24, wherein, the first bitmap indicates beam failure information associated with the first BFD-RS set.

26. The apparatus according to supplement 25, wherein, a BFD-RS set identifier or index of the first BFD-RS set is 0 or 1 or 2.

27. The apparatus according to either one of supplements 25 and 26, wherein, the beam failure recovery MAC CE containing a 1-octet first bitmap further includes a 1-octet second bitmap, the second bitmap being included in a next octet of the first bitmap.

28. The apparatus according to supplement 27, wherein, the second bitmap indicates beam failure information associated with the second BFD-RS set, and the BFD-RS set identifier or index of the second BFD-RS set is different from the BFD-RS set identifier or index of the first BFD-RS set.

29. The apparatus according to supplement 24, wherein, the first bitmap indicates a serving cell where a TRP beam failure is detected.

30. The apparatus according to supplement 29, wherein, the beam failure recovery MAC CE containing a 1-octet first bitmap further includes a 1-octet second bitmap, the second bitmap being included in a next octet of the first bitmap.

31. The apparatus according to supplement 30, wherein, the second bitmap indicates the number of BFD-RS set(s) where a TRP beam failure is detected on the serving cell.

32. The apparatus according to supplement 31, wherein, the number of BFD-RS set(s) with failed TRP beams is 1 or 2, and is indicated by 0 or 1.

33. The apparatus according to supplement 32, wherein, 0 indicates that the number of BFD-RS set(s) where a TRP beam failure is detected is 1, and 1 indicates that the number of BFD-RS set(s) where a TRP beam failure is detected is 2, or 1 indicates that the number of BFD-RS set(s) where a TRP beam failure is detected is 1, and 0 indicates that the number of BFD-RS set(s) where a TRP beam failure is detected is 2.

34. The apparatus according to any one of supplements 31-33, wherein, the serving cell is a serving cell where a TRP beam failure is detected.

35. The apparatus according to any one of supplements 25-34, wherein, the beam failure recovery MAC CE is included in an MAC PDU and taken as a part of the random access procedure.

35a. The apparatus according to supplement 35, wherein, an MAC PDU includes at most one beam failure recovery MAC CE (BFR MAC CE) and/or an enhanced beam failure recovery MAC CE (enhanced BFR MAC CE).

36. The apparatus according to any one of supplements 25-35, wherein, the beam failure recovery MAC CE is an enhanced beam failure recovery MAC CE (enhanced BFR MAC CE) or an enhanced truncated beam failure recovery MAC CE (enhanced truncated BFR MAC CE).

37. An apparatus for receiving beam failure-related information, the apparatus being applicable to a network device, and the apparatus including:

a first receiving unit configured to receive a beam failure recovery MAC CE containing beam failure-related information from a terminal equipment, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

38. The apparatus according to supplement 37, wherein, in the beam failure-related information of the beam failure recovery MAC CE, when octet(s) of a special cell indicating beam failure recovery information for TRP(s) are present, the octet(s) indicating the beam failure recovery information for TRP(s) of the special cell occur earlier than octet(s) of the secondary cells indicating the beam failure recovery information for TRP(s).

39. An apparatus for receiving beam failure-related information, the apparatus being applicable to a network device, and the apparatus including:

a second receiving unit configured to receive a beam failure recovery MAC CE containing beam failure-related information from a terminal equipment, wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap.

40. The apparatus according to supplement 39, wherein, the first bitmap indicates beam failure information associated with the first BFD-RS set.

41. The apparatus according to supplement 39, wherein, the first bitmap indicates a serving cell where a TRP beam failure is detected.

42. A terminal equipment, including the apparatus as described in any one of supplements 1-36.

43. A network device, including the apparatus as described in any one of supplements 37-41.

44. A communication system, including the terminal equipment as described in supplement 42 and/or the network device as described in supplement 43.

Supplement II

1. A method for reporting beam failure-related information, the method being applicable to a terminal equipment, and the method including:

generating a beam failure recovery MAC CE (BFR MAC CE) containing beam failure-related information; and transmitting the beam failure recovery MAC CE to a network device to report the beam failure-related information, wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

2. The method according to supplement 1, wherein, when the octet(s) indicating the beam failure recovery information for TRP(s) are present, the octet(s) indicating the beam failure recovery information for TRP(s) occur based on an ascending order of BFD-RS set identifiers or indices, wherein, octet(s) indicating the beam failure recovery information for TRP(s) with smaller BFD-RS set identifiers or indices occur first, and then octet(s) indicating the beam failure recovery information for TRP(s) with larger BFD-RS set identifiers or indices occur.

3. The method according to supplement 1 or 2, wherein, in the beam failure-related information of the beam failure recovery MAC CE, when octet(s) of a special cell indicating beam failure recovery information for TRP(s) are present, the octet(s) indicating the beam failure recovery information for TRP(s) of the special cell occur earlier than octet(s) of the secondary cells indicating the beam failure recovery information for TRP(s).

4. The method according to supplement 3, wherein, when two TRPs of the special cell trigger beam failure recovery and the beam failure recovery has not been successfully completed, the terminal equipment initiates a random access procedure on the special cell, and the beam failure-related information is reported to the network device during the random access procedure.

5. The method according to any one of supplements 1, 3 and 4, wherein, when the octet(s) indicating beam failure recovery information for TRP(s) are present, the octet(s) indicating beam failure recovery information for TRP(s) occur based on an ascending order of serving cell indices of the secondary cell, wherein, octet(s) indicating beam failure recovery information for TRP(s) of secondary cells with smaller serving cell indices or associated with the secondary cells with smaller serving cell indices occur first, and then octet(s) indicating beam failure recovery information for TRP(s) of secondary cells with larger serving cell indices or associated with secondary cells with larger serving cell indices occur.

6. The method according to supplement 1 or 5, wherein, in the beam failure-related information of the beam failure recovery MAC CE, the number of the octet(s) indicating the beam failure recovery information for TRP(s) corresponding to a serving cell index is one.

7. The method according to any one of supplements 1-4, wherein, when the octet(s) indicating the beam failure recovery information for TRP(s) are present, the octet(s) indicating the beam failure recovery information for TRP(s) occur based on an ascending order of BFD-RS set identifiers or indices and an ascending order of the serving cell indices of the secondary cell, wherein, the octet(s) indicating the beam failure recovery information for TRP(s) occur first based on the ascending order of the BFD-RS set identifiers or indices, and then based on the ascending order of the serving cell indices of the secondary cells, or, the octet(s) indicating the beam failure recovery information for TRP(s) occur first based on the ascending order of the serving cell indices of the secondary cells, and then based on the ascending order of the BFD-RS set identifiers or indices.

8. The method according to supplement 7, wherein that the octet(s) indicating the beam failure recovery information for TRP(s) occur first based on the ascending order of the BFD-RS set identifiers or indices, and then based on the ascending order of the serving cell indices of the secondary cells, includes that:

after all the octet(s) indicating the beam failure recovery information for TRP(s) of the secondary cells with smaller serving cell indices or associated with the secondary cells with smaller serving cell indices occur, the octet(s) indicating beam failure recovery information for TRP(s) of the secondary cells with larger serving cell indices or associated with the secondary cells with larger serving cell indices occur.

9. The method according to supplement 7, wherein that the octet(s) indicating the beam failure recovery information for TRP(s) occur first based on the ascending order of the serving cell indices of the secondary cells, and then based on the ascending order of the BFD-RS set identifiers or indices, includes that:

after all octet(s) indicating the beam failure recovery information for TRP(s) of smaller BFD-RS set identifiers or indices occur, octet(s) indicating beam failure recovery information for TRP(s) of larger BFD-RS set identifiers or indices occur.

10. The method according to any one of supplements 1, 2 and 5-9, wherein, the octet(s) indicating the beam failure recovery information for TRP(s) indicate beam failure recovery information for TRP(s) of the secondary cell.

11. The method according to any one of supplements 1-10, wherein, when a BFD-RS set of a special cell detects a beam failure, the BFD-RS set of the special cell is to be indicated in the beam failure recovery MAC CE and a result of logical channel optimization (LCP) is that UL-SCH resources available for transmission are insufficient for accommodating a beam failure recovery MAC CE containing a first bitmap of 4 octets plus its header, a beam failure recovery MAC CE containing a first bitmap of 1 octet is used to report the beam failure-related information.

12. The method according to supplement 11, wherein, the first bitmap indicates beam failure information with which a first BFD-RS set is associated.

13. The method according to supplement 12, wherein, a BFD-RS set identifier or index of the first BFD-RS set is 0 or 1 or 2.

14. The method according to any one of supplements 11-13, wherein, the beam failure recovery MAC CE containing a first bitmap of 1 octet further contains a second bitmap of 1 octet, the second bitmap being included in a next octet of the first bitmap.

15. The method according to supplement 14, wherein, the second bitmap indicates beam failure information with which a second BFD-RS set is associated, a BFD-RS set identifier or index of the second BFD-RS set being different from the BFD-RS set identifier or index of the first BFD-RS set.

16. The method according to supplement 11, wherein, the first bitmap indicates a serving cell where a TRP beam failure is detected.

17. The method according to supplement 16, wherein, the beam failure recovery MAC CE containing a first bitmap of 1 octet further contains a second bitmap of 1 octet, the second bitmap being included in a next octet of the first bitmap.

18. The method according to supplement 17, wherein, the second bitmap indicates the number of BFD-RS set(s) where a TRP beam failure is detected on the serving cell.

19. The method according to supplement 18, wherein, the number of BFD-RS set(s) with failed TRP beams is 1 or 2, and is indicated by 0 or 1.

20. The method according to supplement 19, wherein, 0 indicates that the number of BFD-RS set(s) where a TRP beam failure is detected is 1, and 1 indicates that the number of BFD-RS set(s) where a TRP beam failure is detected is 2, or 1 indicates that the number of BFD-RS set(s) where a TRP beam failure is detected is 1, and 0 indicates that the number of BFD-RS set(s) where a TRP beam failure is detected is 2.

21. The method according to any one of supplements 18-20, wherein, the serving cell is a serving cell where a TRP beam failure is detected.

22. The method according to any one of supplements 11-21, wherein, the beam failure recovery MAC CE is included in an MAC PDU and taken as a part of the random access procedure.

22a. The method according to supplement 22, wherein,
an MAC PDU includes at most one beam failure recovery MAC CE (BFR MAC CE) and/or an enhanced beam failure recovery MAC CE (enhanced BFR MAC CE).

23. The method according to any one of supplements 1-22, wherein,
the beam failure recovery MAC CE is an enhanced beam failure recovery MAC CE (enhanced BFR MAC CE) or an enhanced truncated beam failure recovery MAC CE (enhanced truncated BFR MAC CE).

24. A method for reporting beam failure-related information, the method being applicable to a terminal equipment, and the method including:
generating a beam failure recovery MAC CE containing beam failure-related information; and
transmitting the beam failure recovery MAC CE to a network device to report the beam failure-related information, wherein,
when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, a beam failure recovery MAC CE containing a 1-octet bitmap is used to report the beam failure-related information.

25. The method according to supplement 24, wherein,
the first bitmap indicates beam failure information associated with the first BFD-RS set.

26. The method according to supplement 25, wherein,
a BFD-RS set identifier or index of the first BFD-RS set is 0 or 1 or 2.

27. The method according to either one of supplements 24-26, wherein,
the beam failure recovery MAC CE containing a 1-octet first bitmap further includes a 1-octet second bitmap, the second bitmap being included in a next octet of the first bitmap.

28. The method according to supplement 27, wherein,
the second bitmap indicates beam failure information associated with the second BFD-RS set, and the BFD-RS set identifier or index of the second BFD-RS set is different from the BFD-RS set identifier or index of the first BFD-RS set.

29. The method according to supplement 24, wherein,
the first bitmap indicates a serving cell where a TRP beam failure is detected.

30. The method according to supplement 29, wherein,
the beam failure recovery MAC CE containing a 1-octet first bitmap further includes a 1-octet second bitmap, the second bitmap being included in a next octet of the first bitmap.

31. The method according to supplement 30, wherein,
the second bitmap indicates the number of BFD-RS set(s) where a TRP beam failure is detected on the serving cell.

32. The method according to supplement 31, wherein,
the number of BFD-RS set(s) with failed TRP beams is 1 or 2, and is indicated by 0 or 1.

33. The method according to supplement 32, wherein,
0 indicates that the number of BFD-RS set(s) where a TRP beam failure is detected is 1, and 1 indicates that the number of BFD-RS set(s) where a TRP beam failure is detected is 2, or
1 indicates that the number of BFD-RS set(s) where a TRP beam failure is detected is 1, and 0 indicates that the number of BFD-RS set(s) where a TRP beam failure is detected is 2.

34. The method according to any one of supplements 31-33, wherein,
the serving cell is a serving cell where a TRP beam failure is detected.

35. The method according to any one of supplements 25-34, wherein,
the beam failure recovery MAC CE is included in an MAC PDU and taken as a part of the random access procedure.

35a. The method according to supplement 35, wherein,
an MAC PDU includes at most one beam failure recovery MAC CE (BFR MAC CE) and/or an enhanced beam failure recovery MAC CE (enhanced BFR MAC CE).

36. The method according to any one of supplements 24-35, wherein,
the beam failure recovery MAC CE is an enhanced beam failure recovery MAC CE (enhanced BFR MAC CE) or an enhanced truncated beam failure recovery MAC CE (enhanced truncated BFR MAC CE).

37. A method for receiving beam failure-related information, the method being applicable to a network device, and the method including:
receiving a beam failure recovery MAC CE containing beam failure-related information from a terminal equipment,
wherein in the beam failure-related information of the beam failure recovery MAC CE, when octet(s) indicating beam failure recovery information for TRP(s) are present, the octet(s) indicating the beam failure recovery information for TRP(s) occur based on an ascending order of BFD-RS set identifiers or indices and/or an ascending order of serving cell indices of secondary cells.

38. The method according to supplement 37, wherein,
in the beam failure-related information of the beam failure recovery MAC CE, when octet(s) of a special cell indicating beam failure recovery information for TRP(s) are present, the octet(s) indicating the beam failure recovery information for TRP(s) of the special cell occur earlier than octet(s) of the secondary cells indicating the beam failure recovery information for TRP(s).

39. A method for receiving beam failure-related information, the method being applicable to a network device, and the method including:
receiving a beam failure recovery MAC CE containing beam failure-related information from a terminal equipment,
wherein when a beam failure is detected in a BFD-RS set of a special cell and the BFD-RS set of the special cell will be indicated in the beam failure recovery MAC CE and a result of logical channel prioritization (LCP) is that a UL-SCH resource available for transmission is insufficient to accommodate a beam failure recovery MAC CE containing a 4-octet bitmap plus it subheader, the beam failure recovery MAC CE received by the network device is a beam failure recovery MAC CE containing a 1-octet bitmap.

40. The method according to supplement 39, wherein, the first bitmap indicates beam failure information associated with the first BFD-RS set.

41. The method according to supplement 39, wherein, the first bitmap indicates a serving cell where a TRP beam failure is detected.

The invention claimed is:

1. An apparatus for reporting beam failure-related information, the apparatus being applicable to a terminal, and the apparatus comprising:

first processor circuitry configured to generate a beam failure recovery Medium Access Control Control Element (BFR MAC CE) containing beam failure-related information; and a first transmitter configured to transmit the beam failure recovery MAC CE to a network device to report the beam failure-related information, wherein in the beam failure-related information of the beam failure recovery MAC CE, when octet(s) indicating beam failure recovery information for Beam Failure Detection Reference Signal (BFD-RS) set(s) are present, the octet(s) indicating the beam failure recovery information for BFD-RS set(s) occur based on an ascending order of serving cell indices of secondary cells, or based on an ascending order of BFD-RS set identifiers or indices and an ascending order of serving cell indices of secondary cells, when random access procedure is initiated in case beam failure recovery is triggered for two BFD-RS sets of a special cell, the BFD-RS sets of the special cell are to be indicated in the BFR MAC CE and a result of a logical channel optimization procedure (LCP) is that Uplink Shared Channel (UL-SCH) resources available for transmission are insufficient for accommodating a BFR MAC CE containing a first bitmap of 4 octets plus its header, a BFR MAC CE containing a first bitmap of 1 octet and a second bitmap of 1 octet is used to report the beam failure-related information, the first bitmap indicates a serving cell where a BFD-RS set beam failure is detected.

2. The apparatus according to claim 1, wherein, in the beam failure-related information of the beam failure recovery MAC CE, when octet(s) of a special cell indicating beam failure recovery information for BFD-RS set(s) are present, the octet(s) indicating the beam failure recovery information for BFD-RS set(s) of the special cell occur earlier than octet(s) of the secondary cells indicating the beam failure recovery information for BFD-RS set(s).

3. The apparatus according to claim 1, wherein, when two BFD-RS sets of the special cell trigger beam failure recovery and the beam failure recovery has not been successfully completed, the terminal initiates a random access procedure on the special cell, and the beam failure-related information is reported to the network device during the random access procedure.

4. The apparatus according to claim 1, wherein, when the octet(s) indicating beam failure recovery information for BFD-RS set(s) are present, the octet(s) indicating beam failure recovery information for BFD-RS set(s) occur based on an ascending order of serving cell indices of the secondary cell, wherein, octet(s) indicating beam failure recovery information for BFD-RS set(s) of secondary cells with smaller serving cell indices or associated with the secondary cells with smaller serving cell indices occur first, and then octet(s) indicating beam failure recovery information for BFD- RS set(s) of secondary cells with larger serving cell indices or associated with secondary cells with larger serving cell indices occur.

5. The apparatus according to claim 1, wherein, when the octet(s) indicating the beam failure recovery information for BFD-RS set(s) are present, the octet(s) indicating the beam failure recovery information for BFD-RS set(s) occur based on an ascending order of BFD-RS set identifiers or indices and an ascending order of the serving cell indices of the secondary cell, wherein, after all the octet(s) indicating the beam failure recovery information for BFD-RS set(s) of the secondary cells with smaller serving cell indices or associated with the secondary cells with smaller serving cell indices occur, the octet(s) indicating beam failure recovery information for BFD-RS set(s) of the secondary cells with larger serving cell indices or associated with the secondary cells with larger serving cell indices occur, or, after all octet(s) indicating the beam failure recovery information for BFD-RS set(s) of smaller BFD-RS set identifiers or indices occur, octet(s) indicating beam failure recovery information for BFD-RS set(s) of larger BFD-RS set identifiers or indices occur.

6. The apparatus according to claim 1, wherein, the second bitmap being comprised in a next octet of the first bitmap.

7. The apparatus according to claim 6, wherein, the second bitmap indicates the number of BFD-RS set(s) where a BFD-RS set beam failure is detected on the serving cell.

8. The apparatus according to claim 7, wherein, the serving cell is a serving cell where a BFD-RS set beam failure is detected.

9. The apparatus according to claim 1, wherein, the beam failure recovery MAC CE is an enhanced beam failure recovery MAC CE (enhanced BFR MAC CE) or an enhanced truncated beam failure recovery MAC CE (enhanced truncated BFR MAC CE).

10. An apparatus for receiving beam failure-related information, the apparatus being applicable to a network device, and the apparatus comprising:

a first receiver configured to receive a beam failure recovery Medium Access Control Control Element (BFR MAC CE) containing beam failure-related information from a terminal, wherein in the beam failure-related information of the beam failure recovery MAC CE, when octet(s) indicating beam failure recovery information for Beam Failure Detection Reference Signal (BFD-RS) set(s) are present, the octet(s) indicating the beam failure recovery information for BFD-RS set(s) occur based on an ascending order of serving cell indices of secondary cells, or based on an ascending order of BFD-RS set identifiers or indices and an ascending order of serving cell indices of secondary cells, when random access procedure is initiated in case beam failure recovery is triggered for two BFD-RS sets of a special cell, the BFD-RS sets of the special cell are to be indicated in the BFR MAC CE and a result of a logical channel optimization procedure (LCP) is that Uplink Shared Channel (UL-SCH) resources available for transmission are insufficient for accommodating a BFR MAC CE containing a first bitmap of 4 octets plus its header, a BFR MAC CE containing a first bitmap of 1 octet and a second bitmap of 1 octet is used to report the beam failure-related information, the first bitmap indicates a serving cell where a BFD-RS set beam failure is detected.

11. A communication system, comprising a terminal and/or a network device, the terminal comprising an apparatus for reporting beam failure-related information, the apparatus being applicable to a terminal, and the apparatus comprising:

first processor circuitry configured to generate a beam failure recovery Medium Access Control Control Element (BFR MAC CE) containing beam failure-related information; and a first transmitter configured to transmit the beam failure recovery MAC CE to a network device to report the beam failure-related information, wherein in the beam failure-related information of the beam failure recovery MAC CE, when octet(s) indicating beam failure recovery information for Beam Failure Detection Reference Signal (BFD-RS) set(s) are present, the octet(s) indicating the beam failure recovery information for BFD-RS set(s) occur based on an ascending order of serving cell indices of secondary cells, or based on an ascending order of BFD-RS set identifiers or indices and an ascending order of serving cell indices of secondary cells, when random access procedure is initiated in case beam failure recovery is triggered for two BFD-RS sets of a special cell, the BFD-RS sets of the special cell are to be indicated in the BFR MAC CE and a result of a logical channel optimization procedure (LCP) is that Uplink Shared Channel (UL-SCH) resources available for transmission are insufficient for accommodating a BFR MAC CE containing a first bitmap of 4 octets plus its header, a BFR MAC CE containing a first bitmap of 1 octet and a second bitmap of 1 octet is used to report the beam failure-related information, the first bitmap indicates a serving cell where a BFD-RS set beam failure is detected, and the network device comprising an apparatus for receiving beam failure-related information, the apparatus being applicable to a network device, and the apparatus comprising:

a first receiver configured to receive a beam failure recovery MAC CE containing beam failure-related information from a terminal, wherein in the beam failure-related information of the beam failure recovery MAC CE, when octet(s) indicating beam failure recovery information for BFD-RS set(s) are present, the octet(s) indicating the beam failure recovery information for BFD-RS set(s) occur based on an ascending order of serving cell indices of secondary cells, or based on an ascending order of BFD-RS set identifiers or indices and an ascending order of serving cell indices of secondary cells, when random access procedure is initiated in case beam failure recovery is triggered for two BFD-RS sets of a special cell, the BFD-RS sets of the special cell are to be indicated in the BFR MAC CE and a result of a logical channel optimization procedure (LCP) is that UL-SCH resources available for transmission are insufficient for accommodating a BFR MAC CE containing a first bitmap of 4 octets plus its header, a BFR MAC CE containing a first bitmap of 1 octet and a second bitmap of 1 octet is used to report the beam failure-related information, the first bitmap indicates a serving cell where a BFD-RS set beam failure is detected.

* * * * *